(12) United States Patent
Jung et al.

(10) Patent No.: US 10,746,213 B2
(45) Date of Patent: Aug. 18, 2020

(54) COUPLING MEMBER, A METHOD OF FIXING THE COUPLING MEMBER TO AN OBJECT, AND A DISPLAY DEVICE HAVING THE COUPLING MEMBER

(71) Applicant: SAMSUNG DISPLAY CO., LTD., Yongin-si, Gyeonggi-Do (KR)

(72) Inventors: Donghoon Jung, Cheonan-si (KR); Kisoo Park, Cheonan-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 99 days.

(21) Appl. No.: 15/948,157

(22) Filed: Apr. 9, 2018

(65) Prior Publication Data

US 2018/0223885 A1 Aug. 9, 2018

Related U.S. Application Data

(62) Division of application No. 15/041,714, filed on Feb. 11, 2016, now Pat. No. 9,957,990.

(30) Foreign Application Priority Data

Feb. 13, 2015 (KR) .................. 10-2015-0022619
Dec. 8, 2015 (KR) .................. 10-2015-0174354

(51) Int. Cl.
*F16B 37/06* (2006.01)
*F16B 5/02* (2006.01)
*F16B 37/04* (2006.01)
*F16M 13/02* (2006.01)
*F16B 5/06* (2006.01)

(52) U.S. Cl.
CPC ............ *F16B 5/0275* (2013.01); *F16B 37/04* (2013.01); *F16B 37/067* (2013.01); *F16M 13/02* (2013.01); *F16B 5/065* (2013.01)

(58) Field of Classification Search
CPC ...... F16B 37/00; F16B 37/065; F16B 37/067; F16B 5/0275
USPC ..................................................... 411/427
See application file for complete search history.

(56) References Cited

U.S. PATENT DOCUMENTS 1,062,015 A * 5/1913 Lane .................. F16L 5/10
 285/139.1
2,282,851 A 5/1942 Burke et al.
2,562,336 A * 7/1951 Selden ................ F16B 5/04
 411/501
3,030,705 A 4/1962 Gill et al.
(Continued)

FOREIGN PATENT DOCUMENTS

CN 103388611 11/2013
DE 102007060089 6/2009
(Continued)

*Primary Examiner* — Flemming Saether
(74) *Attorney, Agent, or Firm* — F. Chau & Associates, LLC

(57) ABSTRACT

A coupling member includes a body including a first section, a second section, and a third section; a first screw part disposed along a first inner portion of the body corresponding to the first section; a second screw part disposed along a second inner portion of the body corresponding to the second section; and a non-screw part disposed in a third inner portion of the body corresponding to the third section, wherein the non-screw part is connected to at least one of the first screw part and the second screw part.

10 Claims, 23 Drawing Sheets

(56) References Cited

U.S. PATENT DOCUMENTS

| | | | |
|---|---|---|---|
| 3,159,842 A | 12/1964 | Neuschotz | |
| 3,215,026 A | 11/1965 | Davis | |
| 3,365,998 A | 1/1968 | Zahodiakin | |
| 4,036,098 A * | 7/1977 | Schruff | F16B 19/1054 411/34 |
| 4,828,438 A | 5/1989 | Shackelford | |
| 5,037,259 A | 8/1991 | Duran et al. | |
| 5,135,340 A | 8/1992 | Stinson | |
| 5,259,713 A | 11/1993 | Renner et al. | |
| 5,294,223 A | 3/1994 | Phillips, II | |
| 5,403,135 A | 4/1995 | Renner et al. | |
| 5,667,328 A * | 9/1997 | Hofle | F16B 5/04 403/242 |
| 5,919,016 A | 7/1999 | Smith et al. | |
| 6,109,849 A * | 8/2000 | Nagayama | F16B 37/065 411/113 |
| 6,761,520 B1 | 7/2004 | Dise | |
| 7,181,820 B2 | 2/2007 | Szuba et al. | |
| 7,223,056 B2 | 5/2007 | Schneider | |
| 7,223,458 B2 | 5/2007 | Tango | |
| 7,241,097 B2 | 7/2007 | Dembowsky et al. | |
| 7,654,104 B2 | 2/2010 | Groll et al. | |
| 7,887,274 B2 * | 2/2011 | Catlin | F16B 37/00 411/427 |
| 8,226,339 B2 | 7/2012 | Neri | |
| 9,419,421 B1 * | 8/2016 | Valentine | H02G 3/14 |
| 9,476,440 B2 * | 10/2016 | Hsu | F16B 5/02 |
| 9,683,593 B1 * | 6/2017 | Strange | F16B 33/00 |
| 2014/0169907 A1 | 6/2014 | Makino et al. | |
| 2016/0242301 A1 | 8/2016 | Jung et al. | |

FOREIGN PATENT DOCUMENTS

| | | |
|---|---|---|
| EP | 0 655 560 | 5/1995 |
| FR | 2290600 | 6/1976 |
| FR | 2414139 | 8/1979 |
| JP | 06345223 | 12/1994 |
| JP | H07217631 | 8/1995 |
| JP | 2006038201 | 9/2008 |
| JP | 2008215604 | 9/2008 |
| WO | 03/022662 | 3/2003 |

* cited by examiner

COUPLING MEMBER, A METHOD OF FIXING THE COUPLING MEMBER TO AN OBJECT, AND A DISPLAY DEVICE HAVING THE COUPLING MEMBER

CROSS-REFERENCE TO RELATED APPLICATION

This U.S. non-provisional patent application is a divisional application of Ser. No. 15/041,714 filed Feb. 11, 2016, which claims priority under 35 U.S.C. § 119 to Korean Patent Application Nos. 10-2015-0022619 filed on Feb. 13, 2015 and 10-2015-0174354 filed on Dec. 8, 2015, the disclosures of which are incorporated by reference herein in their entireties.

TECHNICAL FIELD

The present inventive concept relates to a coupling member, a method of fixing the coupling member to an object, and a display device having the coupling member.

DESCRIPTION OF THE RELATED ART

A display device includes a display panel, a plurality of elements, and a plurality of coupling members, among others. The display device is manufactured by using the coupling members to couple the elements to each other.

The coupling members couple the elements with each other in a variety of ways. For instance, the elements may be coupled with each other by using a hook formed in one element and a hole formed in the other element or by using a bolt and a nut.

When the elements of the display device are assembled to each other using the coupling members, a manufacturing cost of the display device includes a unit cost of the elements and a time used to assemble the elements.

SUMMARY

An exemplary embodiment of the present inventive concept provides a coupling member including a body, a first screw part, a second screw part, and a non-screw part. The body includes a first section, a second section, and a third section. The first screw part is disposed along a first inner portion of the body corresponding to the first section. The second screw part is disposed along a second inner portion of the body corresponding to the second section. The non-screw part is disposed in a third inner portion of the body corresponding to the third section, wherein the non-screw part is connected to at least one of the first screw part and the second screw part.

A thickness of the body corresponding to the third section is smaller than a thickness of the body corresponding to at least one of the first section and the second section.

The first screw part, the non-screw part, and the second screw part are sequentially arranged in a longitudinal direction of the body.

An inner diameter of the body corresponding to the first section is greater than an inner diameter of the body corresponding to the second section.

The coupling member further comprises a cover part disposed at an edge of the body.

The first screw part, the second screw part, and the non-screw part are sequentially arranged in a longitudinal direction of the body.

The coupling member further comprises a cover part disposed between the first section and the second section in the body.

The first screw part and the non-screw part are sequentially arranged in a longitudinal direction of the body and at least a portion of the second screw part is surrounded by the non-screw part.

The coupling member further comprises a sub-body disposed inside of the body to correspond to the second section, wherein the second screw part is disposed inside of the sub-body.

The coupling member further comprises a cover part disposed between the first section and the second section in the body.

The coupling member further comprises a flange part disposed adjacent to the non-screw part and coupled to an outer circumference of the body.

An outer circumference of the body has a polygonal shape when viewed in a plan view.

An exemplary embodiment of the inventive concept provides a coupling member including a body, a screw part, a non-screw part, a cover part, and a flange part. The body includes a first section and a second section, the screw part is disposed in the body in the first section, and the non-screw part is disposed in the body in the second section. The cover part is disposed in the body, coupled to the body, and disposed between the non-screw part and the screw part. The flange part is coupled to an outer circumference of the body.

An exemplary embodiment of the present inventive concept provides a method of fixing a coupling member to an object. The coupling member is provided with a first screw part, a second screw part, and a non-screw part, which are disposed inside of the coupling member. In the method, the coupling member is inserted into a hole in the object to allow the non-screw part to face at least one of the first and second screw parts such that the object is disposed between the non-screw part and at least one of the first and second screw parts.

A head part of a tool is inserted into the coupling member. A rotational force is applied to the head part to couple the second screw part to the head part, and the second screw part is pulled to the hole using the rotational force to bend the non-screw part.

The non-screw part is bent by the rotational force to form a bent part, and a flange part of the coupling member and the bent part fix the coupling member to the object.

The non-screw part has a thickness smaller than a thickness of the second screw part.

The first screw part comprises screw threads to be coupled to a bolt and the second screw part comprises screw threads to be coupled to the head part of the tool.

An exemplary embodiment of the present inventive concept provides a display device including a display panel for displaying an image, a member coupled to the display panel, and a coupling member inserted into a hole formed through the member, the coupling member provided with a coupling hole formed therethrough and coupled to a bolt.

The coupling member includes a body, a first screw part, a second screw part, a flange part, and a bent part. The body has a hollow shape and the first screw part is disposed along a first inner circumference of the body. The second screw part is disposed along a second inner circumference of the body and the flange part is coupled to an outer circumference of the body to support the member. The bent part grips the member in cooperation with the flange part such that the member is disposed between the bent part and the flange part.

A portion of the body used to make the bent part has a thickness that is smaller than a thickness of the body corresponding to a position of the first screw part or the second screw part.

The first screw part, the bent part, and the second screw part are sequentially arranged in a longitudinal direction of the body.

The thickness of the body corresponding to the position of the first screw part is smaller than the thickness of the body corresponding to the position of the second screw part.

The coupling member further comprises a cover part disposed at an edge of the body.

The first screw part, the second screw part, and the folding part are sequentially arranged in a longitudinal direction of the body.

The coupling member further comprises a cover part disposed inside of the body between the first screw part and the second screw part.

At least part of the second screw part is surrounded by the folding part.

The coupling member further comprises a sub-body disposed inside of the body and the second screw part is disposed inside of the sub-body.

The coupling member further comprises a cover part disposed inside the body between the first screw part and the second screw part.

An outer circumference of the body has a polygonal shape when viewed in a plan view.

An exemplary embodiment of the inventive concept provides a coupling member comprising: a hollow body; a first section of the hollow body including screw threads; a second section of the hollow body including screw threads; a third section of the hollow body not including screw threads, wherein the first, second and third sections are arranged in a longitudinal direction of the hollow body, wherein the third section has a first length in the longitudinal direction when the coupling member is in a first state and the third section has a second length in the longitudinal direction when the coupling member is in a second state, and wherein the first length is greater than the second length.

The second state of the coupling member occurs when the coupling member is fixed to an object.

The coupling member further comprises first and second protruding portions protruding from an outer surface of the coupling member corresponding to the third section to fix the coupling member to the object.

BRIEF DESCRIPTION OF THE DRAWINGS

The above and other features of the present inventive concept will become more clearly understood by describing in detail exemplary embodiments thereof with reference to the accompanying drawings wherein.

DETAILED DESCRIPTION OF THE EMBODIMENTS

Exemplary embodiments of the present inventive concept will now be described more fully hereinafter with reference to the accompanying drawings. The present inventive concept, however, may be embodied in various forms and should not be construed as being limited to only the illustrated embodiments.

It will be understood that when an element or layer is referred to as being "on", "connected to" or "coupled to" another element or layer, it can be directly on, connected or coupled to the other element or layer or intervening elements or layers may be present. Like numbers may refer to like elements throughout the specification.

As used herein, the singular forms, "a", "an" and "the" are intended to include the plural forms as well, unless the context clearly indicates otherwise.

Figure 1A:
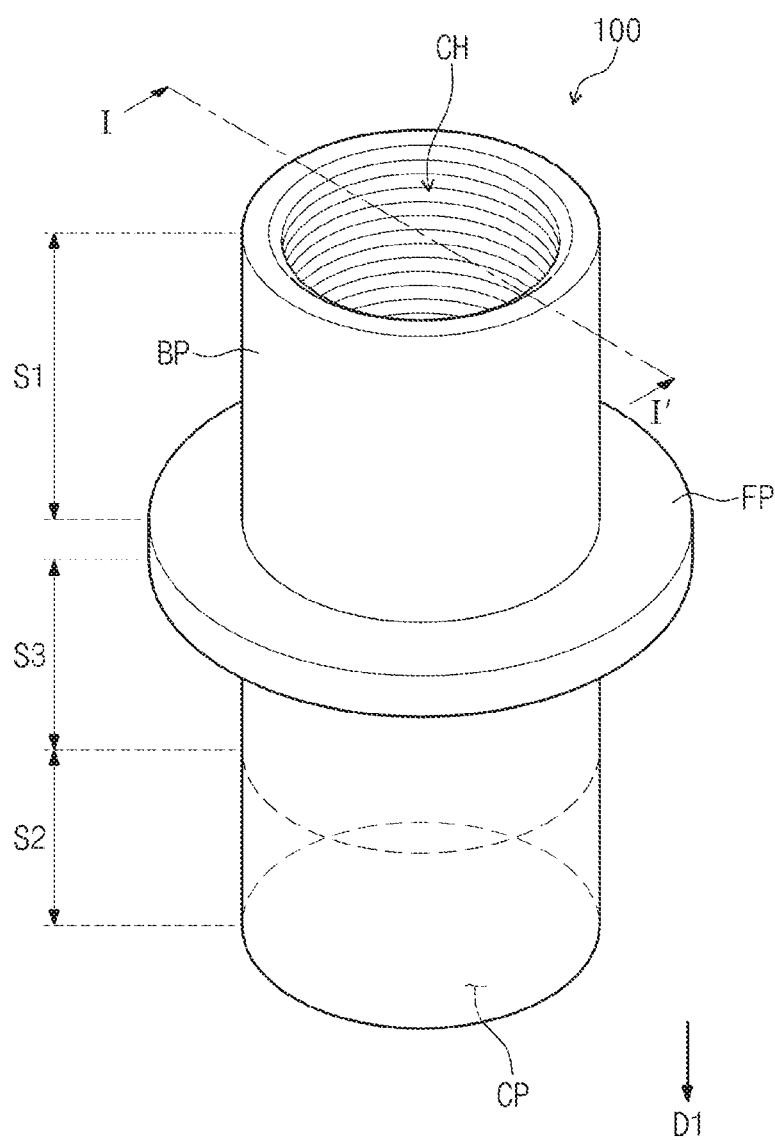
FIG. 1A is a perspective view showing a coupling member according to an exemplary embodiment of the present inventive concept.
Figure 1B:
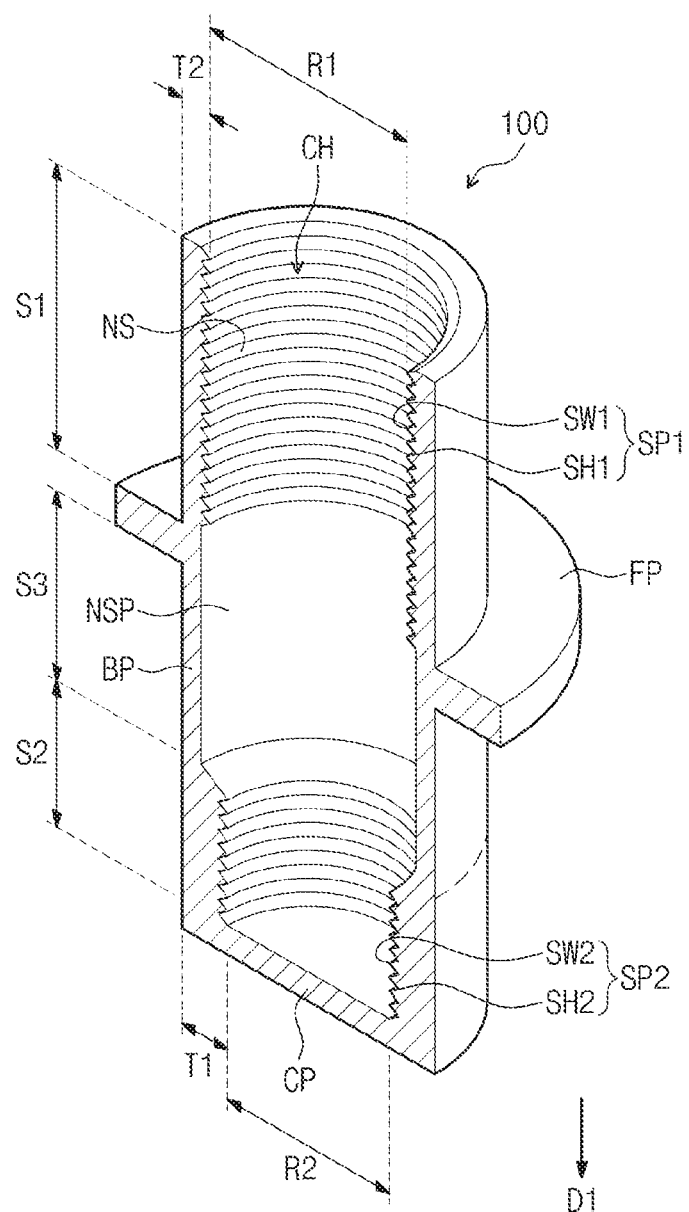
FIG. 1B is a cross-sectional view taken along a line I-I' shown in FIG. 1A, according to an exemplary embodiment of the present inventive concept.
Figure 1C:
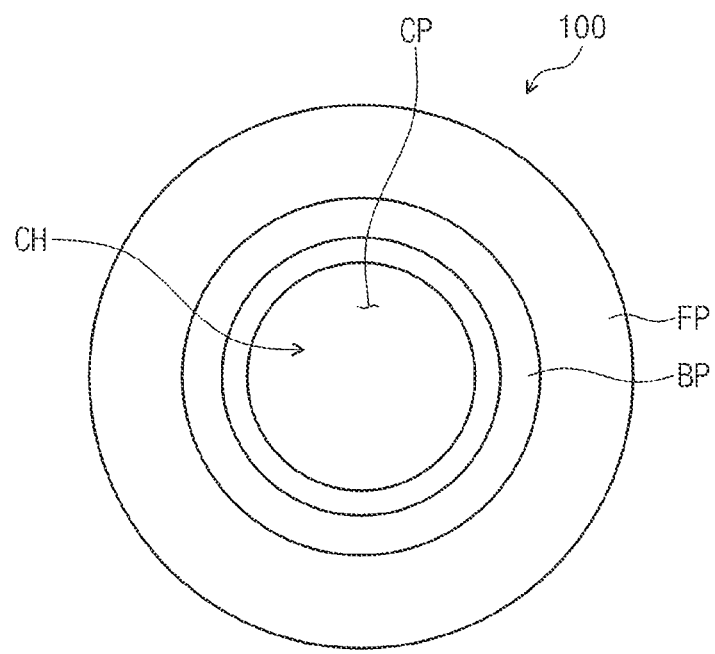
FIG. 1C is a plan view showing the coupling member shown in FIG. 1A, according to an exemplary embodiment of the present inventive concept.

FIG. 1A is a perspective view showing a coupling member 100 according to an exemplary embodiment of the present inventive concept, FIG. 1B is a cross-sectional view taken along a line I-I' shown in FIG. 1A, according to an exemplary embodiment of the present inventive concept, and FIG. 1C is a plan view showing the coupling member 100 shown in FIG. 1A, according to an exemplary embodiment of the present inventive concept.

Figure 3A:
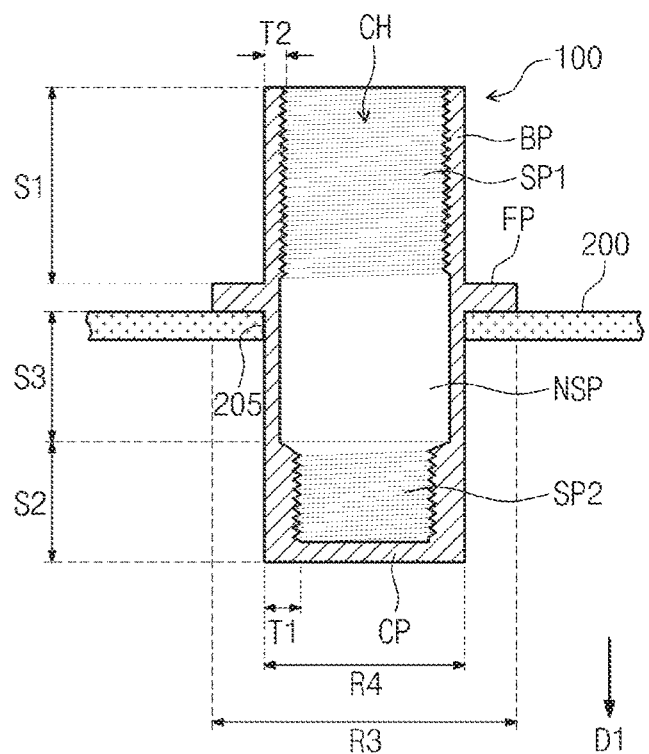
FIGS. 3A, 3B, 3C, 3D and 3E are views showing a method of fixing the coupling member shown in FIGS. 1A to 1C to an object, according to an exemplary embodiment of the present inventive concept.
Figure 3B:
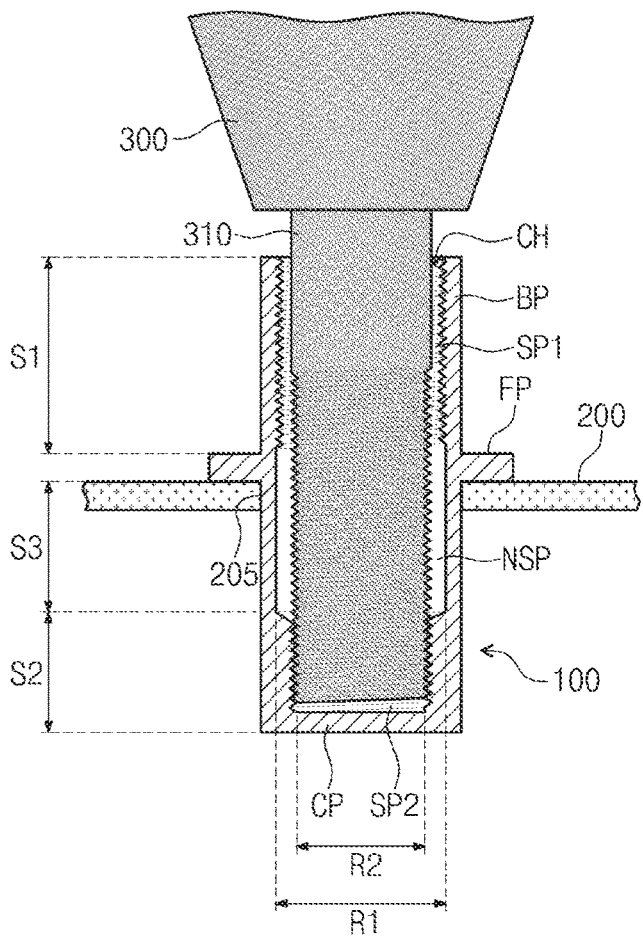
Figure 3C:
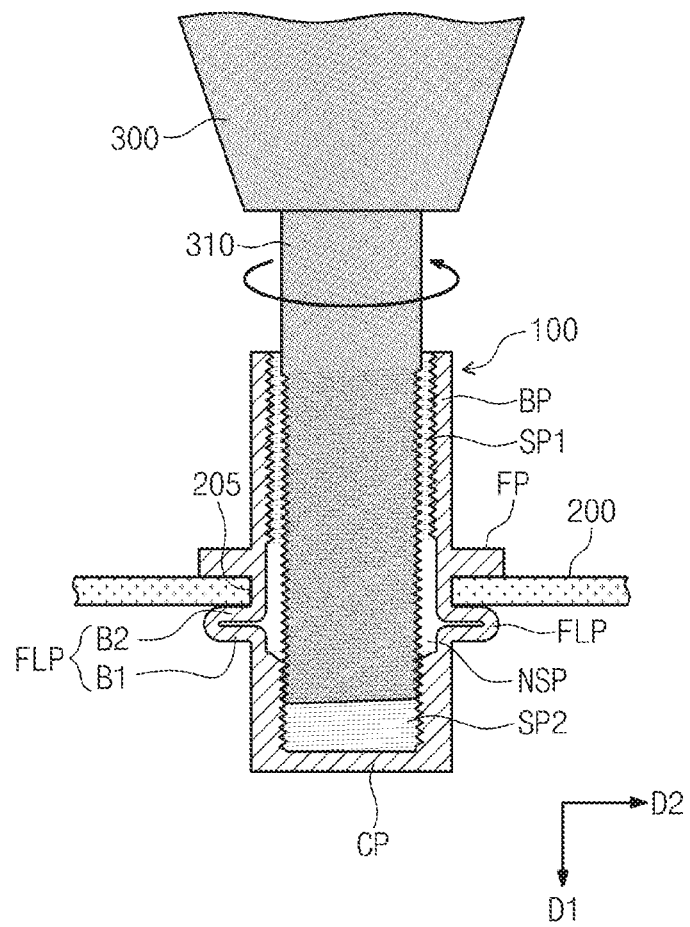
Figure 3D:
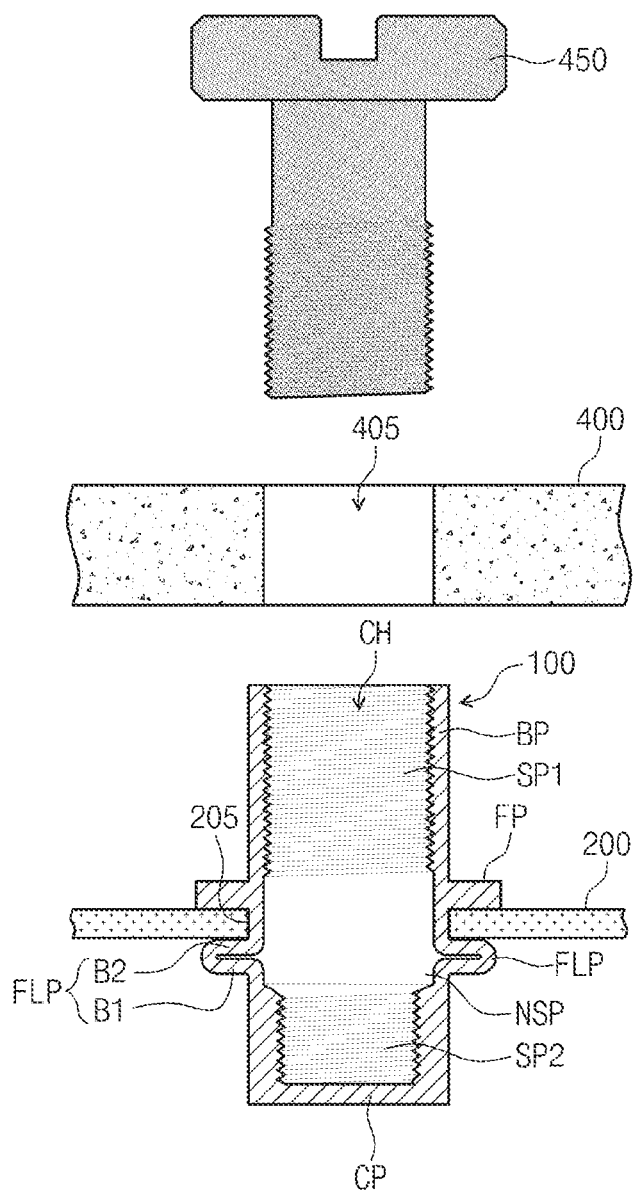

Referring to FIGS. 1A, 1B, and 1C, the coupling member 100 includes a coupling hole CH for being coupled to a bolt 450 (refer to FIG. 3D). The coupling member 100 may function as a nut to fix an object 200 (refer to FIG. 3D) to a member 400 (refer to FIG. 3D) in cooperation with the bolt 450.

The coupling member 100 includes a body BP, a first screw part SP1, a second screw part SP2, a non-screw part NSP, a flange part FP, and a cover part CP. The body BP includes a metallic material, e.g., aluminum, iron, alloy steel, etc.

The body BP has a hollow shape extending in a first direction D1 and the coupling hole CH extending in the first direction D1 is defined through the body BP. In the present exemplary embodiment, the first direction D1 may be substantially parallel to a longitudinal direction of the coupling member 100.

The body BP includes a first section S1, a second section S2, and a third section S3. A longitudinal direction of each of the first, second, and third sections S1, S2, and S3 is substantially parallel to the first direction D1. In the present exemplary embodiment, the first, second, and third sections S1, S2, and S3 are arranged in order of the first, third, and second sections S1, S3, and S2 along the first direction D1 such that the third section S3 is disposed between the first and second sections S1 and S2.

In the present exemplary embodiment, a second thickness T2 of the body BP corresponding to the first and third sections S1 and S3 is smaller than a first thickness T1 of the body BP corresponding to the second section S2.

The first screw part SP1 is defined along an inner circumference of the body BP corresponding to the first section S1. The first screw part SP1 includes first screw threads SW1 and first screw valleys SH1. The first screw threads SW1 are defined on an inner surface NS of the body BP corresponding to the first section S1 and the first screw valleys SH1 are defined on the inner surface NS of the body BP corresponding to the first section S1.

The first screw threads SW1 are alternately arranged with the first screw valleys SH1. In other words, the first screw threads SW1 are located between adjacent first screw valleys SH1 and the first screw valleys SH1 are located between adjacent first screw threads SW1. The first screw threads SW1 and the first screw valleys SH1 are coupled to screw valleys and screw threads of the bolt 450 inserted into the coupling member 100 through the coupling hole CH, respectively.

The second screw part SP2 is defined along the inner circumference of the body BP corresponding to the second section S2. The second screw part SP2 includes second screw threads SW2 and second screw valleys SH2. The second screw threads SW2 are defined on the inner surface NS of the body BP corresponding to the second section S2 and the second screw valleys SH2 are defined on the inner surface NS of the body BP corresponding to the second section S2.

The second screw threads SW2 are alternately arranged with the second screw valleys SH2. In other words, the second screw threads SW2 are located between adjacent second screw valleys SH2 and the second screw valleys SH2 are located between adjacent second screw threads SW2. The second screw threads SW2 and the second screw valleys SH2 are coupled to screw valleys and screw threads of a head part 310 (refer to FIG. 3B) of a tool 300 (refer to FIG. 3B) inserted into the coupling member 100 through the coupling hole CH, respectively.

The non-screw part NSP is defined inside of the body BP to correspond to the third section S3. Different from the first and second screw parts SP1 and SP2, the non-screw part NSP does not include screw threads and screw valleys, which are defined in the body BP. In other words, the inner surface NS of the body BP has an even shape in the third section S3. For example, the inner surface NS of the body BP may be smooth.

Different from the first and second screw parts SP1 and SP2, the non-screw part NSP is used to form a folding part FLP (refer to FIG. 3C) in the coupling member 100 without being coupled to other elements inside the coupling member 100. The use of the non-screw part NSP will be described in detail with reference to FIG. 3C.

In the present exemplary embodiment, a first inner diameter R1 of the body BP corresponding to the first section S1 is greater than a second inner diameter R2 of the body BP corresponding to the second section S2. Accordingly, when the second screw part SP2 is coupled to the head part 310 of the tool 300, the head part 310 is prevented from making contact with the first screw part SP1.

The flange part FP is disposed between the first and third sections S1 and S3, and the flange part FP is coupled to an outer circumference of the body BP and is adjacent to the non-screw part NSP. The flange part FP makes contact with the object 200 (refer to FIG. 3A) to support the object 200. In addition, when the folding part FLP (refer to FIG. 3C) is formed in the coupling member 100, the flange part FP grips the object 200 together with the folding part FLP and fixes the coupling member 100 to the object 200.

In the present exemplary embodiment, the flange part FP has a circular ring shape when viewed in a plan view and each of inner and outer circumferences of the flange part FP has a circular shape, but the shape of the flange part FP is not be limited thereto. In other words, at least one of the inner and outer circumferences of the flange part FP may have a polygonal shape when viewed in a plan view. The polygonal shape of the flange part FP will be described in detail with reference to FIG. 2.

The cover part CP is disposed at an edge of the body BP to shield an inner portion of the body BP from the outside of the body BP. Therefore, although the coupling member 100 includes the cover part CP, the inner portion of the body BP is still hollow in the first, second, and third sections S1, S2, and S3. The cover part CP prevents foreign substances generated when the first and second screw parts SP1 and SP2 are coupled to other elements from being discharged to the outside of the coupling member 100. In other words, the foreign substances may remain inside the coupling member 100.

Figure 2:
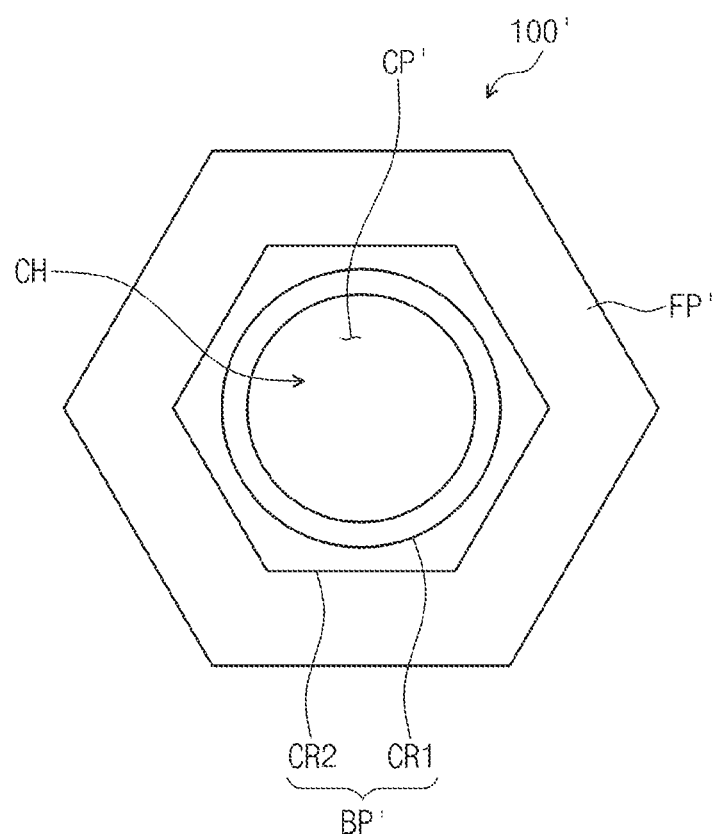
FIG. 2 is a plan view showing a coupling member according to an exemplary embodiment of the present inventive concept.

FIG. 2 is a plan view showing a coupling member 100' according to an exemplary embodiment of the present disclosure. In FIG. 2, the same reference numerals denote the same elements in FIGS. 1A to 1C, and thus detailed descriptions of the same elements will be omitted.

Referring to FIG. 2, the coupling member 100' includes a first screw part, a second screw part, a non-screw part, a flange part FP', a cover part CP', and a body BP'. The first screw part, the second screw part, and the non-screw part may have the same structures as those of the first screw part SP1 (refer to FIG. 1B), the second screw part SP2 (refer to FIG. 1B), and the non-screw part NSP (refer to FIG. 1B), respectively.

When viewed in a plan view, an inner circumference CR1 of the body BP' has a circular shape, but an outer circumference CR2 of the body BP' has a polygonal shape. In addition, the flange part FP' is coupled to the outer circumference CR2 of the body BP'. Each of inner and outer circumferences of the flange part FP' has the polygonal shape when viewed in a plan view.

When the outer circumference CR2 of the body BP' has the polygonal shape, a hole 205 (refer to FIG. 3A) formed through the object 200 (refer to FIG. 3A) has the polygonal shape corresponding to that of the outer circumference CR2 when viewed in a plan view to allow the coupling member 100' to penetrate through the hole 205 of the object 200. In this case, when a rotational force is applied to the coupling member 100', a portion of the body BP', which is inserted into the hole, is prevented from spinning.

FIGS. 3A to 3E are views showing a method of fixing the coupling member 100 shown in FIGS. 1A to 1C to an object, according to an exemplary embodiment of the present inventive concept.

Referring to FIG. 3A, the coupling member 100 is inserted into the hole 205 formed through the object 200. The object 200 may have a plate shape. For instance, the object 200 has a plate shape like that of a portion of a bottom chassis 580 (refer to FIG. 8A) of a display device 600 (refer to FIG. 8A). However, the shape of the object 200 is not limited to the plate shape. For example, the object 200 might not be entirely flat.

The flange part FP has an outer diameter R3 greater than a diameter R4 of the hole 205. Thus, when the coupling member 100 is inserted into the hole 205, the second screw part SP2 and the non-screw part NSP pass through the object 200 and the flange part FP is placed on the object 200 to make contact with the object 200. The coupling member 100 is stopped from passing completely through the hole 205 by the flange part FP contacting with the object 200. In addition, when assuming that the first direction D1 is a vertical direction, the second screw part SP2 and the non-screw part NSP are disposed under the object 200 and the first screw part SP1 is disposed above the object 200. A portion of the non-screw part NSP may also be disposed above the object 200.

Referring to FIG. 3B, after the coupling member 100 is inserted into the hole 205 of the object 200, the head part 310 of the tool 300 is inserted into the coupling member 100 through the coupling hole CH, and then the head part 310 is coupled to the second screw part SP2. As shown in FIG. 3B, the screw threads and the screw valleys formed along an outer surface of the head part 310 couple the head part 310 to the second screw part SP2 via the screw valleys and screw threads of the second screw part SP2, respectively.

The first inner diameter R1 of the body BP corresponding to the first and third sections S1 and S3 is greater than the second inner diameter R2 of the body BP corresponding to the second section S2. Accordingly, when the second screw part SP2 is coupled to the head part 310, the head part 310 may be prevented from making contact with the first screw part SP1 and the non-screw part NSP.

Referring to FIG. 3C, a rotational force is applied to the head part 310 while the head part 310 is coupled to the second screw part SP2. The rotational force is indicated by the arrow shown in FIG. 3C being rotated in the counter-clockwise direction. As a result, the second screw part SP2 is pulled up to the hole 205. In other words, the second screw part SP2 gets closer to the hole 205.

In addition, when the second screw part SP2 is pulled up due to the rotational force, the first screw part SP1 and the non-screw part NSP are not initially affected by the rotational force since the first screw part SP1 and the non-screw part NSP are spaced apart from the head part 310. In other words, the rotational force is selectively applied to the second screw part SP2 of the coupling member 100, and thus the second screw part SP2 of the coupling member 100 is selectively pulled up to the hole 205 by the rotational force. However, as the second screw part SP2 is pulled up, the non-screw part NSP is affected by the rotational force.

As shown in FIG. 3A, since the second thickness T2 of the body BP corresponding to the third section S3 is smaller than the first thickness T1 of the body BP corresponding to the second section, the non-screw part NSP is folded when the second screw part SP2 is pulled up to the hole 205, and thus the folding part FLP is formed.

When the non-screw part NSP is folded to form the folding part FLP, the folding part FLP makes contact with a rear surface of the object 200. In addition, since the object 200 is interposed between the flange part FP and the folding part FLP, the flange part FP and the folding part FLP grip the object 200 like a clamp when viewed in a cross-sectional view. Therefore, the coupling member 100 is fixed to the object 200 by the flange part FP and the folding part FLP.

In the present exemplary embodiment, the folding part FLP includes a first bending part B1 and a second bending part B2. The first and second bending parts B1 and B2 are made by bending portions of the body BP corresponding to the third section S3 (refer to FIG. 3B) when the second screw part SP2 is pulled up to the hole 205. When it assumed that the object 200 extends in a second direction D2 in a cross-sectional view, each of the first and second bending parts B1 and B2 is defined by bent portions of the body BP in the second direction D2.

Figure 3E:
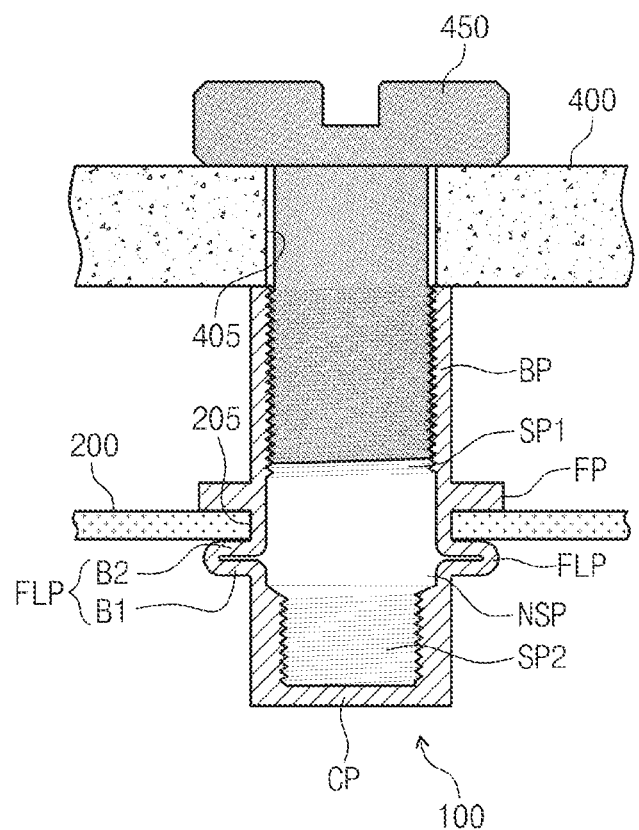

Referring to FIGS. 3D and 3E, after the folding part FLP is formed in the coupling member 100, the head part 310 (refer to FIG. 3C) is separated from the coupling member 100. Then, a member 400 is placed on the coupling member 100 to allow a thru-hole 405 of the member 400 to be aligned with the coupling hole CH of the coupling member 100.

Then, the bolt 450 is inserted into the coupling member 100 after passing through the thru-hole 405 of the member 400 and rotated to complete its coupling to the coupling member 100. As a result, the object 200 is fixed to the member 400 by the coupling force between the bolt 450 and the coupling member 100.

Referring to FIGS. 3C and 3E, the head part 310 of the tool 300 is inserted into the coupling member 100 from above the object 200, and the bolt 450 is inserted into the coupling member 100 from above the object 200. When the lower side of the object 200 is referred to as (or actually is) an inside of the object 200 and the upper side of the object 200 is referred to as (or actually is) an outside of the object 200, the first screw part SP1 protrudes to the outside of the object 200. In this case, a space, in which the first screw part SP1 is accommodated, is not necessary to be disposed inside of the object 200, and thus the space used to accommodate the coupling member 100 inside of the object 200 is reduced.

Figure 4:
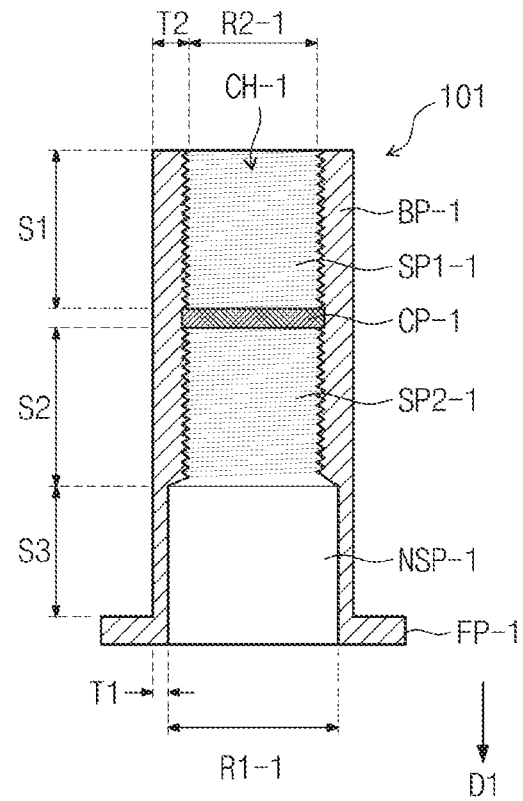
FIG. 4 is a cross-sectional view showing a coupling member according to an exemplary embodiment of the present inventive concept.

FIG. 4 is a cross-sectional view showing a coupling member 101 according to an exemplary embodiment of the present inventive concept.

Referring to FIG. 4, the coupling member 101 is provided with a coupling hole CH-1 formed therethrough to be coupled to an external bolt. The coupling member 101 includes a body BP-1, a first screw part SP1-1, a second screw part SP2-1, a non-screw part NSP-1, a flange part FP-1, and a cover part CP-1.

The body BP-1 has a shape extending in the first direction D1. The body BP-1 includes a first section S1, a second section S2, and a third section S3. The first, second, and third sections S1, S2, and S3 are sequentially arranged in the first direction D1.

The first screw part SP1-1 is defined along an inner circumference of the body BP-1 corresponding to the first section S1 and the second screw part SP2-1 is defined along the inner circumference of the body BP-1 corresponding to the second section S2. The non-screw part NSP-1 is defined along the inner circumference of the body BP-1 corresponding to the third section S3.

As described with reference to FIGS. 3B and 3C, the non-screw part NSP-1 is used to form a folding part FLP-1 in the coupling member 101. This will be described in detail with reference to FIG. 5C.

In the present exemplary embodiment, a first inner diameter R1-1 of the body BP-1 corresponding to the third section S3 is greater than a second inner diameter R2-1 of the body BP-1 corresponding to the first and second sections S1 and S2. Accordingly, when the second screw part SP2-1 is coupled to a head part 310 (refer to FIG. 5C) of a tool 300 (refer to FIG. 5C), the head part 310 is prevented from making contact with the non-screw part NSP-1.

The flange part FP-1 is disposed at an edge of the body BP-1 and adjacent to the non-screw part NSP-1. The flange part FP-1 is coupled to an outer circumference of the body BP-1. The flange part FP-1 makes contact with an object 200 (refer to FIG. 5A) to support the object 200.

In the present exemplary embodiment, the cover part CP-1 is disposed inside the body BP-1. In addition, the cover part CP-1 is disposed between the first section S1 and the second section S2 to block the first screw part SP1-1 and the second screw part SP2-1 from each other. Therefore, the inner portion of the body BP-1 is divided by the cover part CP-1 between the first and second sections S1 and S2. The inner portion of the body BP-1 corresponding to the second and third sections S2 and S3 may not be blocked. Thus, an object may be inserted into the section S2 via the third section S3.

FIGS. 5A to 5E are views showing a method of fixing the coupling member 101 shown in FIG. 4 to the object 200 according to an exemplary embodiment of the present inventive concept.

Figure 5A:
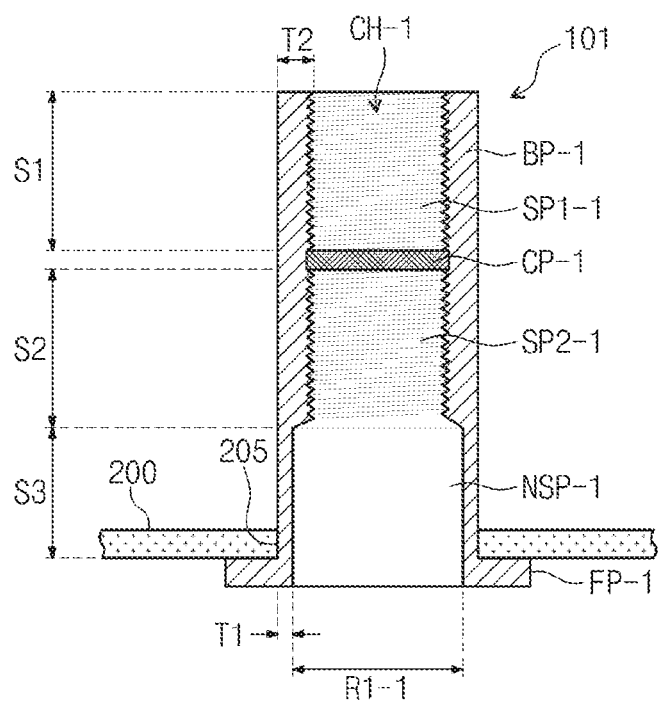
FIGS. 5A, 5B, 5C, 5D and 5E are views showing a method of fixing the coupling member shown in FIG. 4 to an object, according to an exemplary embodiment of the present inventive concept.
Figure 5B:
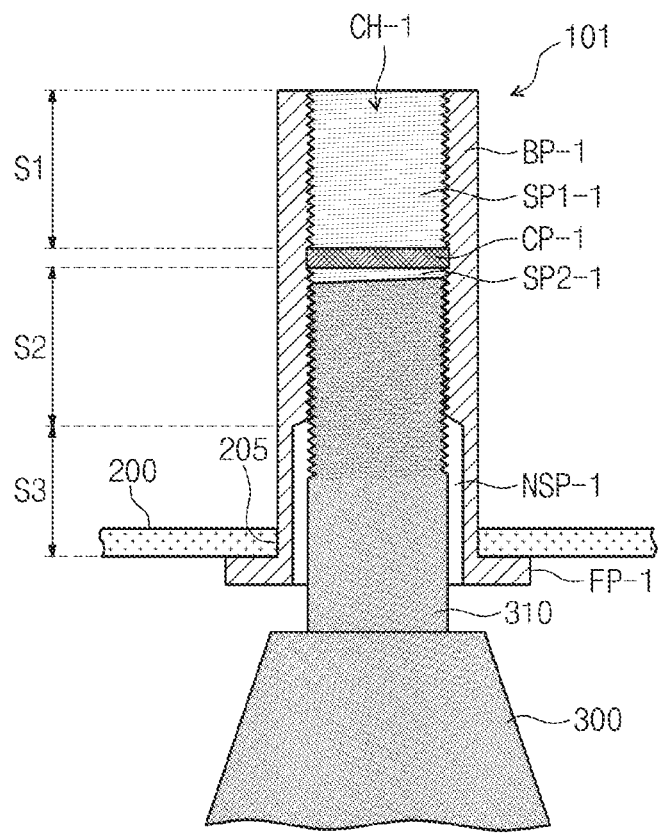

Referring to FIGS. 5A and 5B, the coupling member 101 is inserted into the hole 205 of the object 200. Then, the head part 310 of the tool 300 is inserted into the coupling member 101 through the hole 205 and coupled to the second screw part SP2-1.

As shown in FIG. 4, the first inner diameter R1-1 of the non-screw part NSP-1 is greater than the second inner diameter R2-1 of the second screw part SP2-1. Thus, when the head part 310 is coupled to the second screw part SP2-1, the head part 310 does not make contact with the non-screw part NSP-1.

Figure 5C:
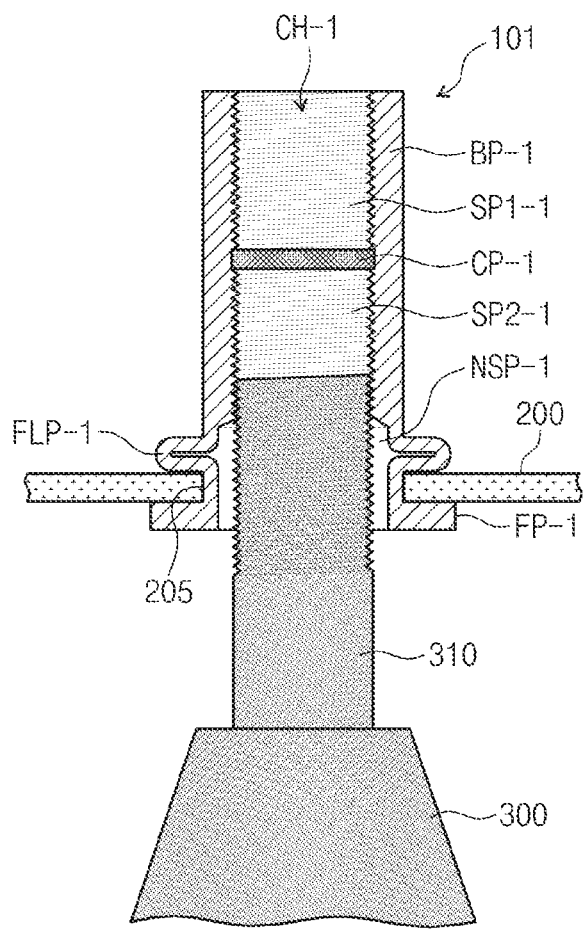

Referring to FIG. 5C, a rotational force is applied to the head part 310 while the head part 310 of the tool 300 is coupled to the second screw part SP2-1. As a result, the second screw part SP2-1 is pulled down to the hole 205 by the rotational force.

In addition, when the second screw part SP2-1 is pulled down due to the rotational force, the first screw part SP1-1 is not affected by the rotational force since the first screw part SP1-1 is blocked from the second screw part SP2-1 by the cover part CP-1. When the second screw part SP2-1 is pulled down due to the rotational force, the non-screw part NSP-1 is not initially affected by the rotational force since the non-screw part NSP-1 is spaced apart from the head part 310. In other words, the rotational force is selectively applied to the second screw part SP2-1 of the coupling member 101, and thus the second screw part SP2-1 of the coupling member 101 is selectively pulled down to the hole 205 by the rotational force. However, as the second screw part SP2-1 is pulled down, the non-screw part NSP-1 is affected by the rotational force.

For example, since the non-screw part NSP-1 has the first thickness T1 smaller than the second thickness T2 of the second screw part SP2-1, the non-screw part NSP-1 is folded when the second screw part SP2-1 pulled down to form the folding part FLP-1. The folding part FLP-1 makes contact with a rear surface of the object 200. In addition, the object 200 is interposed between the flange part FP-1 and the folding part FLP-1, and when viewed in a cross-sectional view, the flange part FP-1 and the folding part FLP-1 grip the object 200 like a clamp. Accordingly, the coupling member 101 may be fixed to the object 200 by the flange part FP-1 and the folding part FLP-1.

Figure 5D:
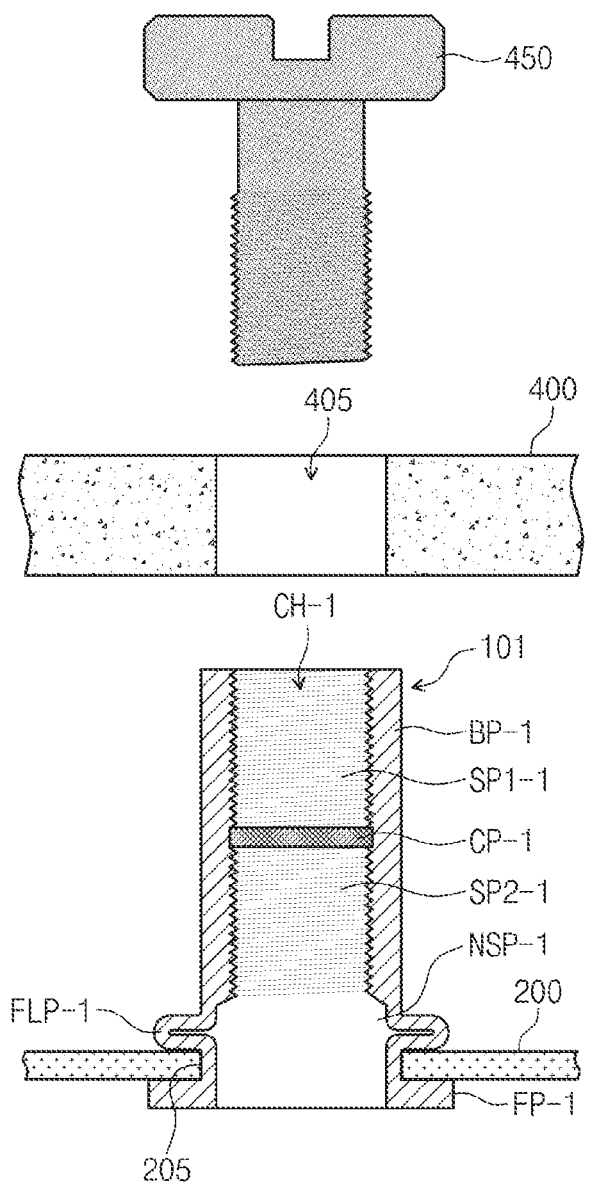
Figure 5E:
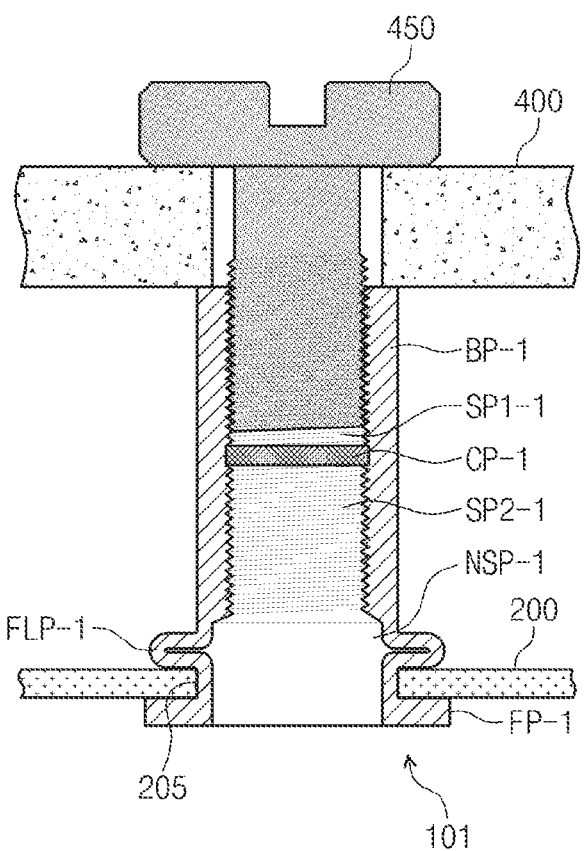

Referring to FIGS. 5D and 5E, after the folding part FLP-1 is formed in the coupling member 101, the head part 310 (refer to FIG. 5C) is separated from the coupling member 101. Then, the member 400 is disposed above the coupling member 101 and the bolt 450 is inserted into the coupling member 101 after passing through the thru-hole 405 of the member 400.

Then, the bolt 450 is rotated and coupled to the coupling member 101. Therefore, the object 200 is fixed to the member 400 by the coupling force between the bolt 450 and the coupling member 101.

When the lower side of the object 200 is referred to as (or actually is) an inside of the object 200 and the upper side of the object 200 is referred to as (or actually is) an outside of the object 200, the flange part FP-1 is disposed inside of the object 200, but other parts of the coupling member 101 except for the flange part FP-1 are disposed outside of the object 200. In this case, the first screw part SP1-1 and the second screw part SP2-1 are not found inside of the object 200, and thus a volume of a portion of the coupling member 101, which is protruded to the inside of the object 200, may be reduced.

Figure 6:
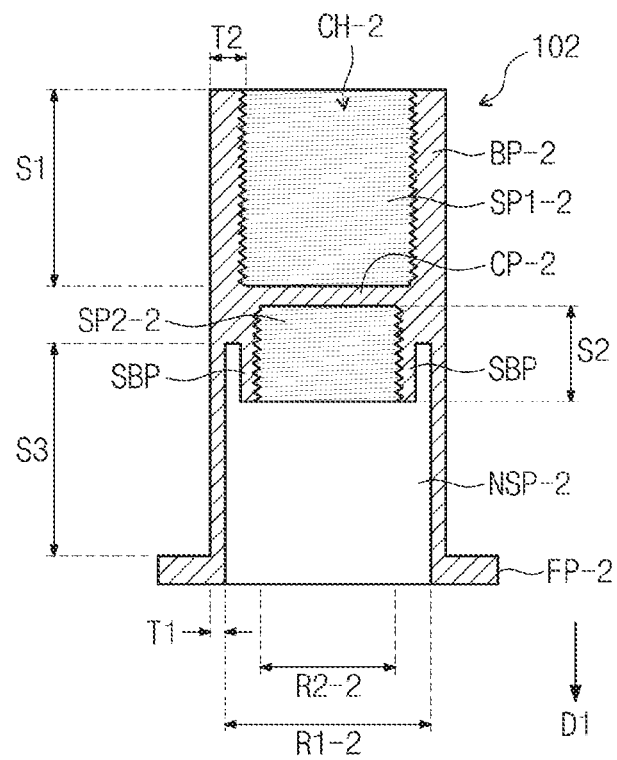
FIG. 6 is a cross-sectional view showing a coupling member according to an exemplary embodiment of the present inventive concept.

FIG. 6 is a cross-sectional view showing a coupling member 102 according to an exemplary embodiment of the present inventive concept.

Referring to FIG. 6, the coupling member 102 is provided with a coupling hole CH-2 formed therethrough and configured to be coupled to an external bolt. The coupling member 102 includes a body BP-2, a sub-body SBP, a first screw part SP1-2, a second screw part SP2-2, a non-screw part NSP-2, a flange part FP-2, and a cover part CP-2.

The body BP-2 has a shape extending in the first direction D1. The body BP-2 includes a first section S1, a second section S2, and a third section S3. The sub-body SBP is disposed inside of the body BP-2 to correspond to the second section S2.

The first screw part SP1-2 is defined along an inner circumference of the body BP-2 corresponding to the first section S1 and the non-screw part NSP-2 is defined along the inner circumference of the body BP-2 corresponding to the third section S3.

In addition, the second screw part SP2-2 is defined along an inner circumference of the sub-body SBP corresponding to the second section S2. Accordingly, the second screw part SP2-2 is surrounded by the non-screw part NSP-2.

The non-screw part NSP-2 is used to form a folding part FLP-2 (refer to FIG. 7C) in the coupling member 102. This will be described in detail with reference to FIG. 7C.

In the present exemplary embodiment, a first inner diameter R1-2 of the non-screw part NSP-2 is greater than a second inner diameter R2-2 of the second screw part SP2-2. Accordingly, when the second screw part SP2-2 is coupled to a head part 310 (refer to FIG. 7C) of a tool 300, the head part 310 is prevented from making contact with the non-screw part NSP-2.

The flange part FP-2 is disposed at an edge of the body BP-2 and adjacent to the non-screw part NSP-2. The flange part FP-2 is coupled to an outer circumference of the body BP-2. In addition, the cover part CP-2 is disposed inside the body BP-2 to block the first screw part SP1-2 from the second screw part SP2-2.

FIGS. 7A to 7E are views showing a method of fixing the coupling member 102 shown in FIG. 6 to an object 200 according to an exemplary embodiment of the present inventive concept.

Figure 7A:
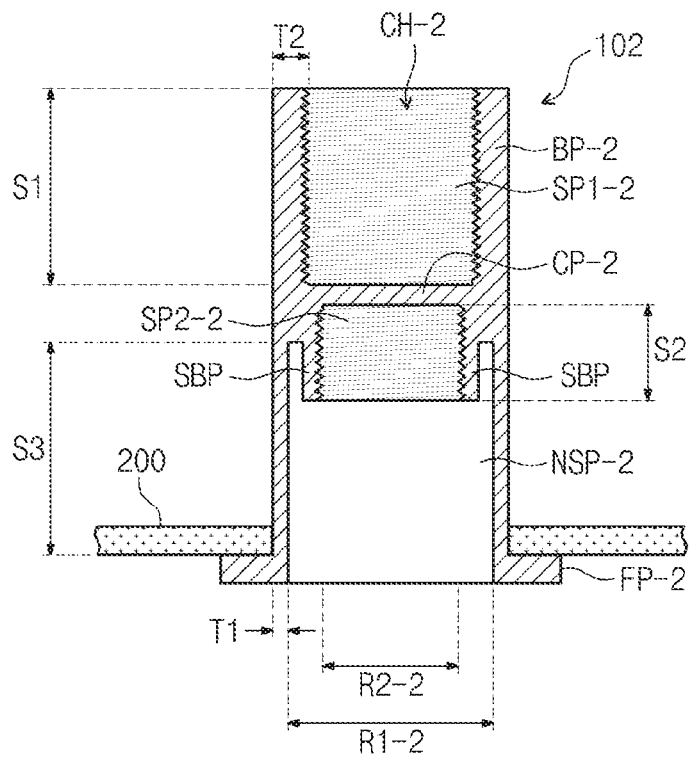
FIGS. 7A, 7B, 7C, 7D and 7E are views showing a method of fixing the coupling member shown in FIG. 6 to an object, according to an exemplary embodiment of the present inventive concept.
Figure 7B:
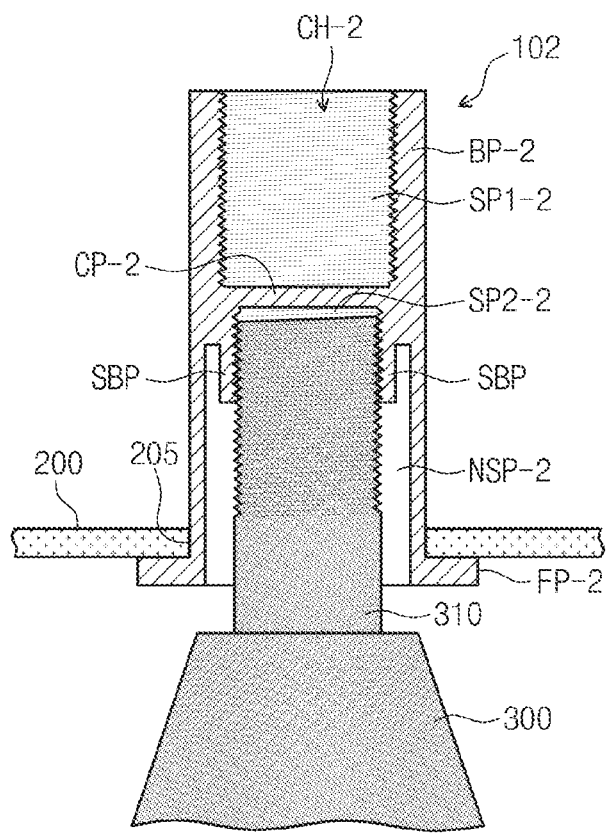

Referring to FIGS. 7A and 7B, the coupling member 102 is inserted into the hole 205 of the object 200. Then, the head part 310 of the tool 300 is inserted into the coupling member 101 through the hole 205 and coupled to the second screw part SP2-2.

As shown in FIG. 6, the first inner diameter R1-2 of the non-screw part NSP-2 is greater than the second inner diameter R2-2 of the second screw part SP2-2. Thus, when the head part 310 is coupled to the second screw part SP2-2, the head part 310 does not make contact with the non-screw part NSP-2.

Figure 7C:
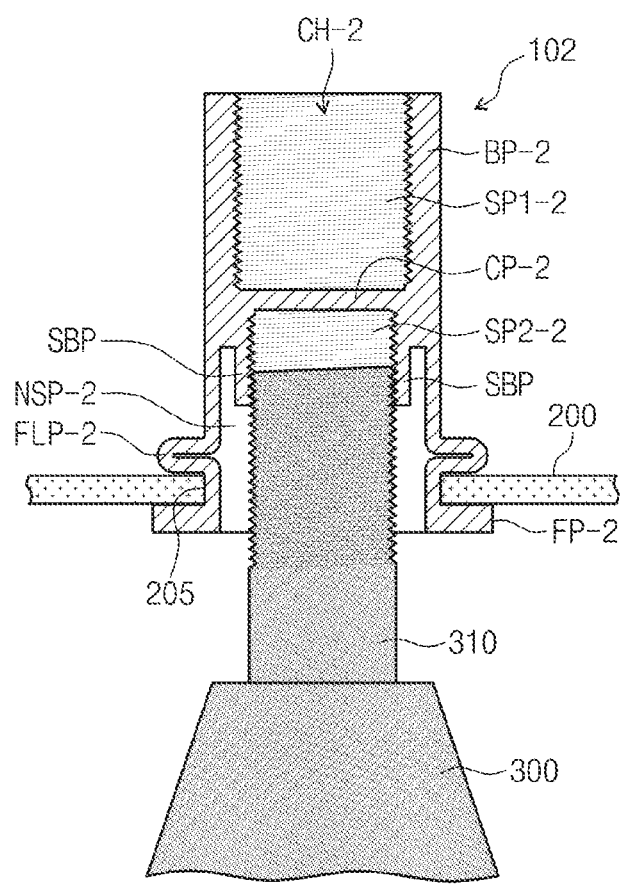

Referring to FIG. 7C, a rotational force is applied to the head part 310 while the head part 310 of the tool 300 is coupled to the second screw part SP2-2. As a result, the second screw part SP2-2 is pulled down to the hole 205 by the rotational force, and thus the non-screw part NSP-2 having a first thickness T1 (refer to FIG. 6) smaller than a second thickness T2 (refer to FIG. 6) of the second screw part SP2-2 is folded to form the folding part FLP-2.

The folding part FLP-2 makes contact with a rear surface of the object 200. In addition, the object 200 is interposed between the flange part FP-2 and the folding part FLP-2, and when viewed in a cross-sectional view, the flange part FP-2 and the folding part FLP-2 grip the object 200 like a clamp. Accordingly, the coupling member 102 may be fixed to the object 200 by the flange part FP-2 and the folding part FLP-2.

Figure 7D:
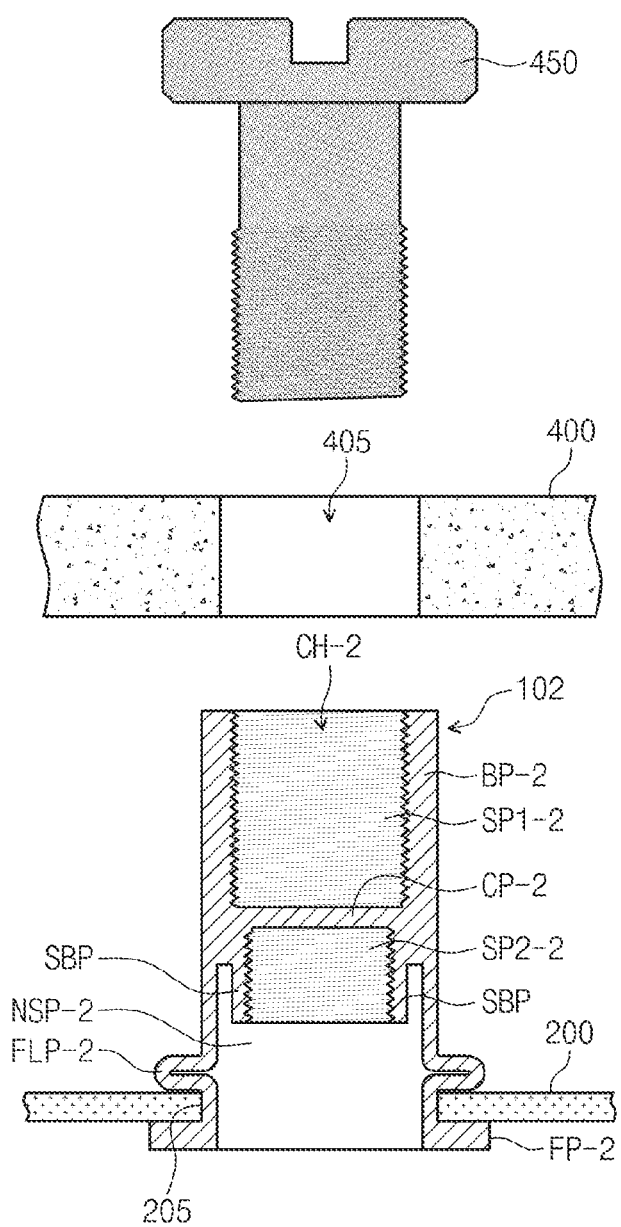
Figure 7E:
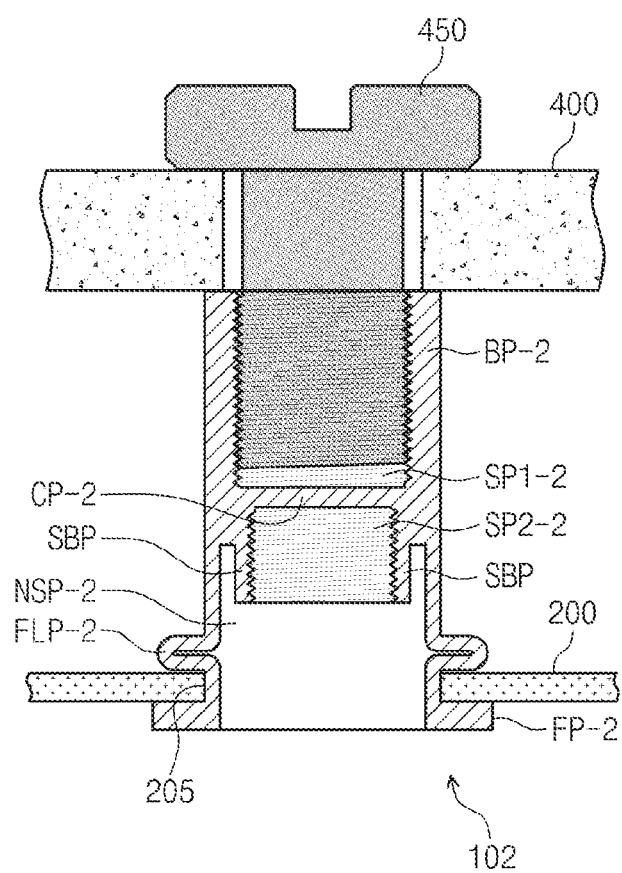

Referring to FIGS. 7D and 7E, after the folding part FLP-2 is formed in the coupling member 102, the head part 310 (refer to FIG. 7C) is separated from the coupling member 102. Then, the member 400 is disposed above the coupling member 102 and the bolt 450 is inserted into the coupling member 101 after passing through the thru-hole 405 of the member 400.

Then, the bolt 450 is rotated and coupled to the coupling member 102. Therefore, the object 200 is fixed to the member 400 by the coupling force between the bolt 450 and the coupling member 102.

When the lower side of the object 200 is referred to as (or actually is) an inside of the object 200 and the upper side of the object 200 is referred to as (or actually is) an outside of the object 200, other parts of the coupling member 102 except for the flange part FP-1 are disposed outside of the object 200. In this case, the first screw part SP1-2 and the second screw part SP2-2 are not found inside of the object 200, and thus a volume of a portion of the coupling member 102, which is protruded to the inside of the object 200, may be reduced.

Further, since the second screw part SP2-2 is surrounded by the non-screw part NSP-2, a volume of a portion of the coupling member 102, which is protruded to the outside of the object 200, may be reduced.

Figure 8A:
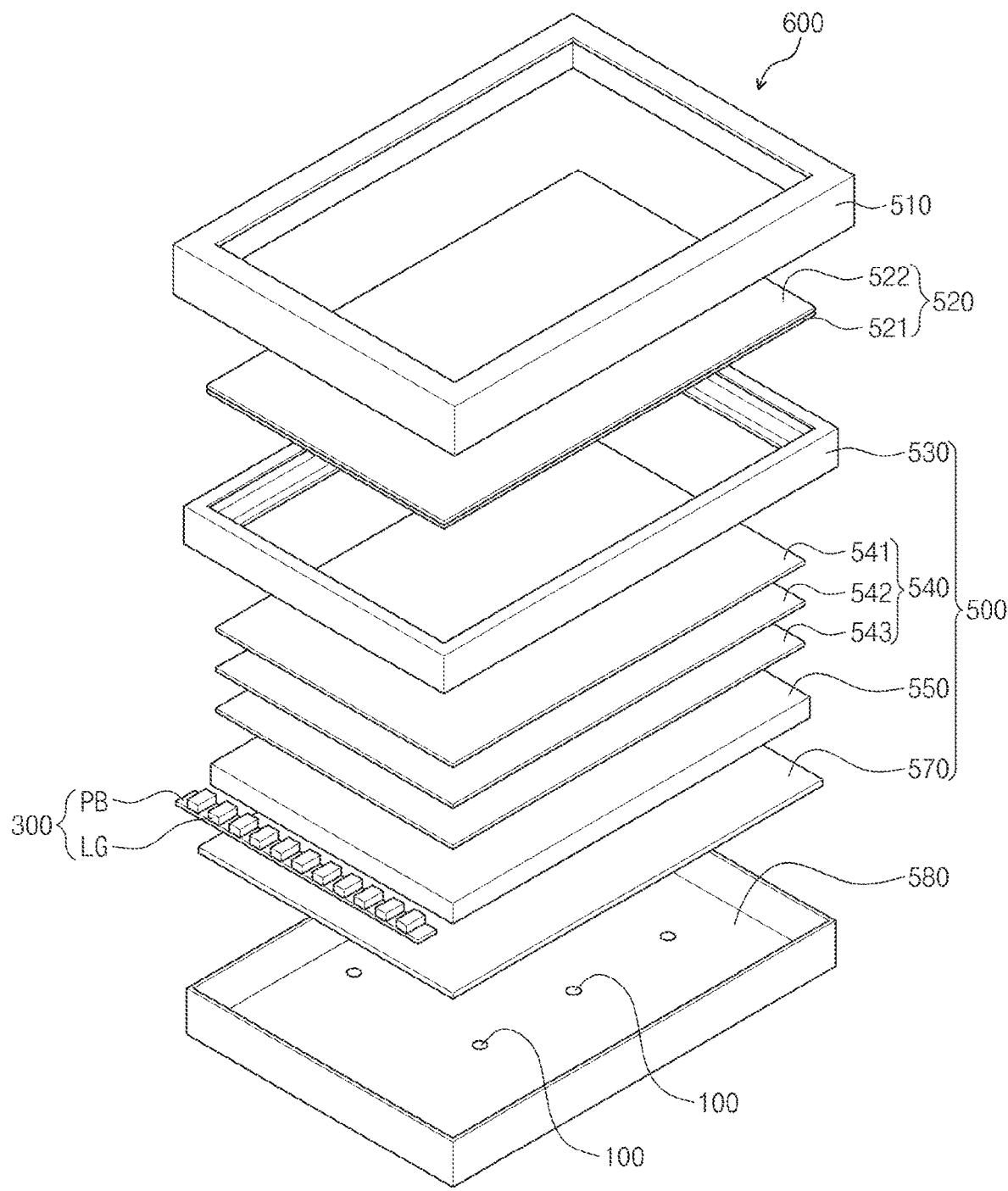
FIG. 8A is an exploded perspective view showing a display device including the coupling member shown in FIGS. 1A to 1C, according to an exemplary embodiment of the present inventive concept.
Figure 8B:
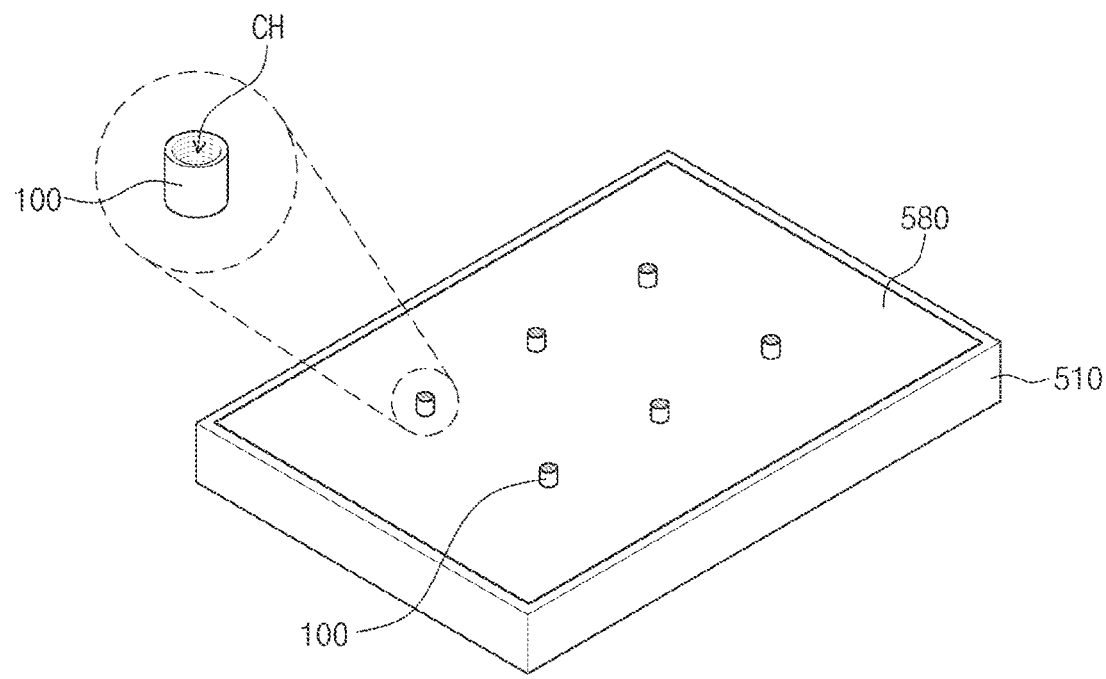
FIG. 8B is a rear view showing the display device shown in FIG. 8A, according to an exemplary embodiment of the present inventive concept.

FIG. 8A is an exploded perspective view showing a display device 600 including the coupling member 100 shown in FIGS. 1A to 1C according to an exemplary embodiment of the present inventive concept and FIG. 8B is a rear view showing the display device 600 shown in FIG. 8A according to an exemplary embodiment of the present inventive concept.

Referring to FIGS. 8A and 8B, the display device 600 includes a backlight assembly 500 and a display panel 520. The backlight assembly 500 generates a light and provides the light to the display panel 520, and the display panel 520 receives the light to display an image.

The display device 600 may further include a plurality of members including an accommodating member 580 (e.g., a bottom chassis) and a cover member 510. The accommodating member 580 provides an accommodating space to accommodate the backlight assembly 500 and the display panel 520. The cover member 510 is coupled to the accommodating member 580 to cover a non-display area of the display panel 520.

In the present exemplary embodiment, the display panel 520 may be, but is not limited to, a liquid crystal display panel and includes a display substrate 521, an opposite substrate 522, and a liquid crystal layer interposed between the display substrate 521 and the opposite substrate 522. The display substrate 521 includes a plurality of pixel electrodes respectively disposed in a plurality of pixel areas and the opposite substrate 522 includes a common electrode facing the pixel electrodes.

The display panel 520 is not limited to the liquid crystal display panel. For instance, another display panel such as an organic electroluminescent display panel may be used as the display panel 520, and in this case the backlight assembly 500 may be removed from the display device 600.

In addition, the display panel 520 is not limited to the above-mentioned structure. For instance, the common electrode may be included in the display substrate 521 instead of being included in the opposite substrate 522.

The backlight assembly 500 includes a light emitting unit 300, the accommodating member 580, a reflection plate 570, a light guide plate 550, a mold frame 530, and a plurality of sheets 540.

The light emitting unit 300 emits the light. The light emitting unit 300 includes a printed circuit board PB and a plurality of light emitting diode packages LG. The printed circuit board PB is disposed adjacent to one side portion of the light guide plate 550 and the light emitting diode packages LG are mounted on the printed circuit board PB. The light emitting diode packages LG generate the light in response to a source voltage provided from the printed circuit board PB and the light generated by the light emitting diode packages LG is incident to the light guide plate 550.

The light guide plate 550 is accommodated in the accommodating member 580 and the light generated by the light emitting unit 300 and incident to the light guide plate 550 is guided to the display panel 520. The reflection plate 570 includes a material that reflects the light, e.g., polyethylene terephthalate (PET), aluminum, etc., and is disposed between a bottom portion of the accommodating member 580 and the light guide plate 550.

The mold frame 530 is elongated along sidewalls of the accommodating member 580 and is coupled to the accommodating member 580. In addition, the mold frame 530 fixes an edge of the light guide plate 550 accommodated in the accommodating member 580 to the bottom portion of the accommodating member 580, and the sheets 540 and the display panel 520 are sequentially stacked within the mold frame 530.

The sheets 540 are disposed between the display panel 520 and the light guide plate 550. In the present exemplary embodiment, the sheets 540 include a diffusion sheet 543 for diffusing the light, a prism sheet 542 for condensing the diffused light to increase a front brightness of the display panel 520, and a protective sheet 541 for protecting a rear surface of the display panel 520.

In the present exemplary embodiment, the backlight assembly 500 is not limited to the above-mentioned structure. For instance, the light guide plate 550 may be omitted from the backlight assembly 500 and the light emitting unit 300 may be provided in a plural number on the bottom portion of the accommodating member 580.

In addition, the coupling member 100 described with reference to FIGS. 1A to 1C may be fixed to the bottom portion of the accommodating member 580. The coupling member 100 is disposed in the display device 600 such that the coupling hole CH is exposed to the outside of the display device 600. Accordingly, the display device 600 including the accommodating member 580 may be fixed to another member using a bolt (e.g., 450, refer to FIG. 3E) coupled to the coupling hole CH of the coupling member 100.

As described with reference to FIGS. 3A to 3E, the coupling member 100 is inserted into the hole defined in the accommodating member 580 from the outside of the display device 600, and then the coupling member 100 is fixed to the accommodating member 580 using the head part 310 (refer to FIG. 3C) of the tool 300 (refer to FIG. 3C). Hereinafter, the use of the coupling member 100 will be described in detail with reference to FIGS. 9A and 9B.

Figure 9A:
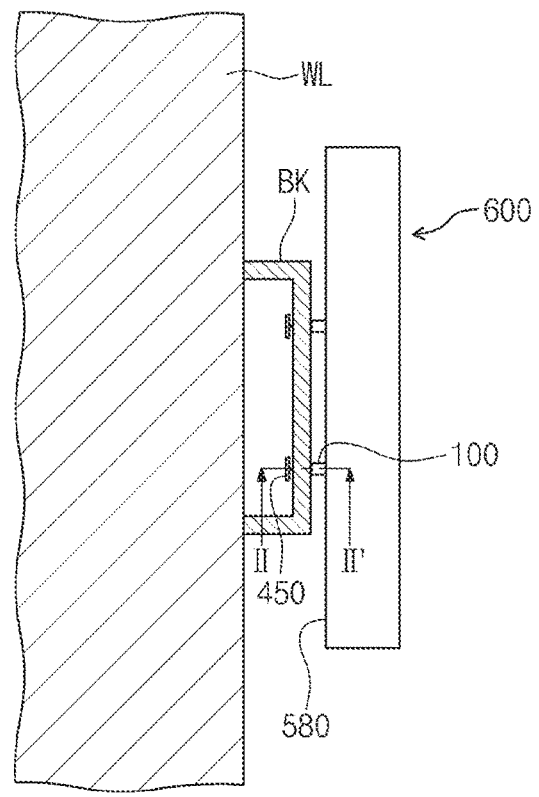
FIG. 9A is a view showing the use of the coupling member of the display device shown in FIGS. 8A and 8B, according to an exemplary embodiment of the present inventive concept.
Figure 9B:
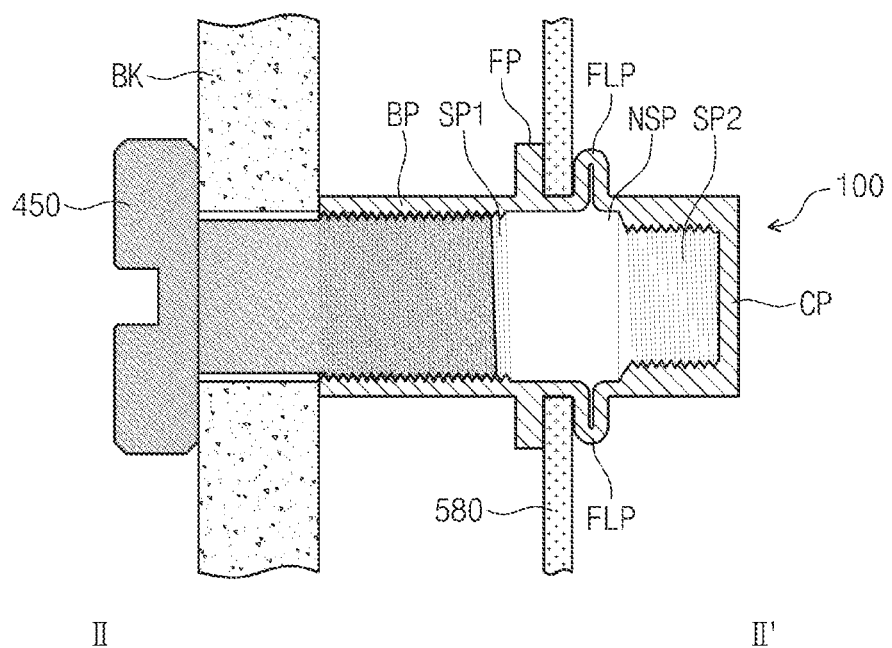
FIG. 9B is a cross-sectional view taken along a line II-IT shown in FIG. 9A, according to an exemplary embodiment of the present inventive concept.

FIG. 9A is a view showing the use of the coupling member 100 of the display device 600 shown in FIGS. 8A and 8B according to an exemplary embodiment of the present inventive concept and FIG. 9B is a cross-sectional view taken along a line II-II' shown in FIG. 9A according to an exemplary embodiment of the present inventive concept.

Referring to FIGS. 8B, 9A, and 9B, the display device 600 is fixed to a wall WL using the coupling member 100 coupled to the display device 600. For example, a bracket BK is fixed to the wall WL and the bolt 450 is inserted into the coupling member 100 after passing through the bracket BK. A user may fasten the bolt 450 to couple the bolt 450 to the coupling member 100.

Accordingly, the display device 600 is fixed to the bracket BK by the coupling force between the bolt 450 and the coupling member 100, and substantially simultaneously the display device 600 is fixed to the wall WL.

As described above, the user may fix the coupling member 100 to the accommodating member 580 at the outside of the display device 600 and may couple the bolt 450 to the coupling member 100 at the outside of the display device 600.

According to an exemplary embodiment of the present inventive concept, the coupling member is provided with the coupling hole coupled to the bolt and the screw parts are defined inside of the coupling hole, and thus the coupling member may function as a nut. In addition, the coupling member is fixed to the member and the screw parts of the coupling member are protruded outwardly. Therefore, a space, in which the screw parts are accommodated, is not necessary to be defined inside of the object, and thus the space defined inside of the object is reduced.

Figure 10:
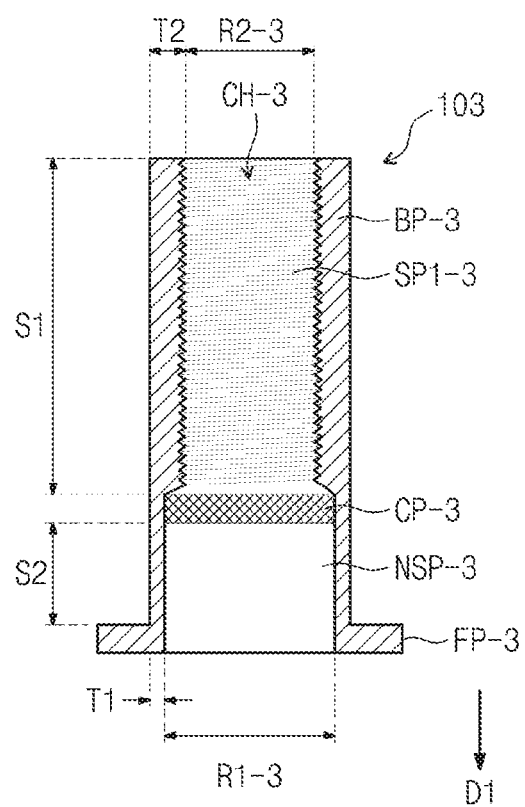
FIG. 10 is a cross-sectional view showing a coupling member according to an exemplary embodiment of the present inventive concept.

FIG. 10 is a cross-sectional view showing a coupling member 103 according to an exemplary embodiment of the present inventive concept.

Referring to FIG. 10, the coupling member 103 provides a coupling hole CH-3 to be coupled to an external bolt. The coupling member 103 includes a body BP-3, a screw part SP1-3, a non-screw part NSP-3, a flange part FP-3, and a cover part CP-3.

The body BP-3 has a hollow shape and extends in a first direction D1, and thus, a longitudinal direction of the body BP-3 is arranged in the first direction D1. In addition, the body BP-3 includes a first section S1 and a second section S2, and the first and second sections S1 and S2 are sequentially arranged along the first direction D1 in the body BP-3.

In the present exemplary embodiment, the screw part SP1-3, the cover part CP-3, the non-screw part NSP-3, and the flange part FP-3 are sequentially arranged in the first direction D1.

The screw part SP1-3 is defined in and along an inner circumference of the body BP-3 corresponding to the first section S1. The screw part SP1-3 can be coupled to a bolt 450 (refer to FIG. 12E) provided from the outside.

The non-screw part NSP-3 is defined in an area inside of the body BP-3 corresponding to the second section S2. The non-screw part NSP-3 is folded by a pressing process to form a folding part FLP-3 (refer to FIG. 12C). The folding part FLP-3 will be described in detail with reference to FIG. 12C.

In the present exemplary embodiment, a second thickness T2 of the body BP-3 corresponding to the first section S1 is greater than a first thickness T1 of the body BP-3 corresponding to the second section S2. Accordingly, an inner diameter R1-3 of the body BP-3 corresponding to the second section S2 is greater than an inner diameter R2-3 of the body BP-3 corresponding to the first section S1.

The coupling hole CH-3 is found at one edge of the body BP-3 and the flange part FP-3 is found at the other edge of the body BP-3. The flange part FP-3 is coupled to an outer circumference of the body BP-3. The flange part FP-3 makes contact with an object 200 (refer to FIG. 12A) to support the object 200.

In the present exemplary embodiment, the flange part FP-3 may have a variety of shapes corresponding to the outer circumference of the body BP-3. For instance, in the case where the outer circumference of the body BP-3 has the circular shape as shown in FIG. 1C, each of inner and outer circumferences of the flange part FP-3 may have the circular shape when viewed in a plan view. According to an exemplary embodiment of the present inventive concept, in the case where the outer circumference of the body BP-3 has the polygonal shape as shown in FIG. 2, each of the inner and outer circumferences of the flange part FP-3 may have the polygonal shape when viewed in a plan view.

The cover part CP-3 is accommodated in the body BP-3 and coupled to the body BP-3. In addition, the cover part CP-3 is disposed between the first section S1 and the second section S2 to block the screw part SP1-3 from the non-screw part NSP-3. Therefore, the screw part SP1-3 is spaced apart from the non-screw part NSP-3 by the cover part CP-3 in the body BP-3.

Figure 12A:
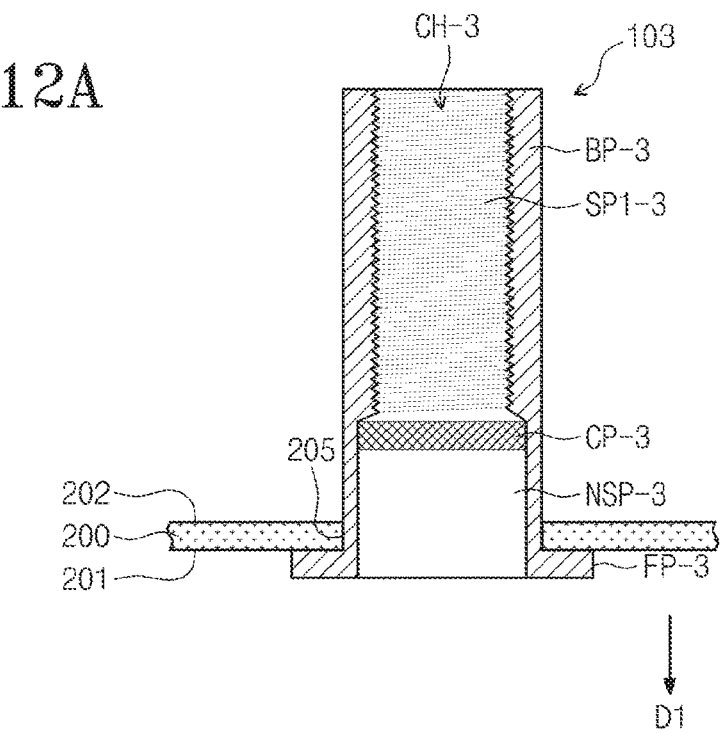
FIGS. 12A, 12B, 12C, 12D and 12E are views showing a method of fixing the coupling member shown in FIG. 10 to an object, according to an exemplary embodiment of the present inventive concept.
Figure 12B:
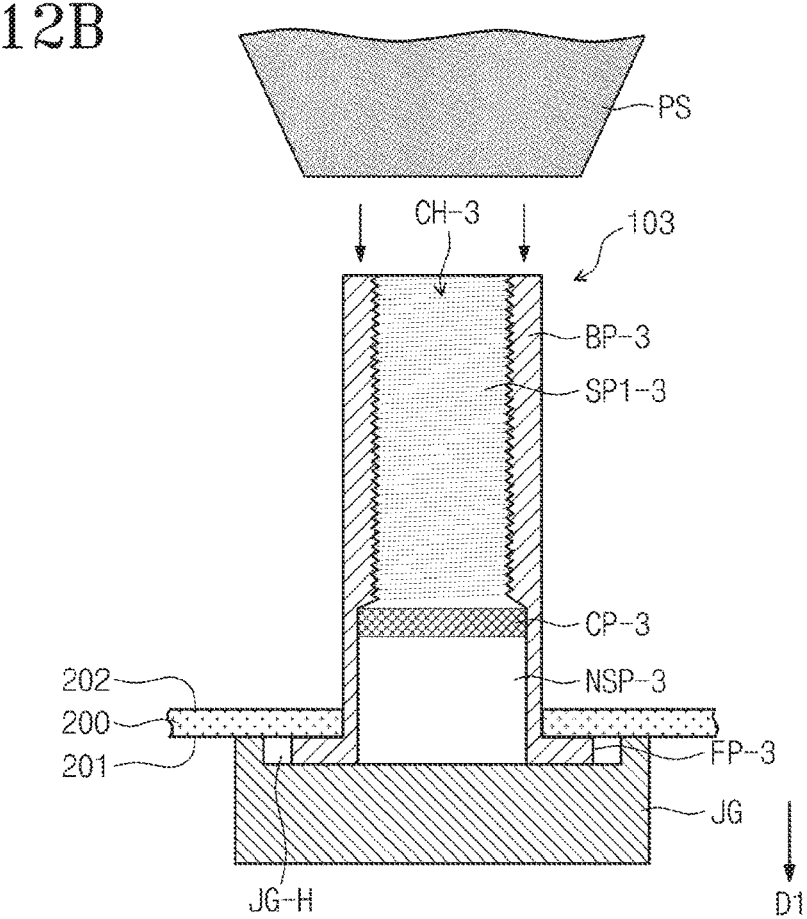
Figure 12C:
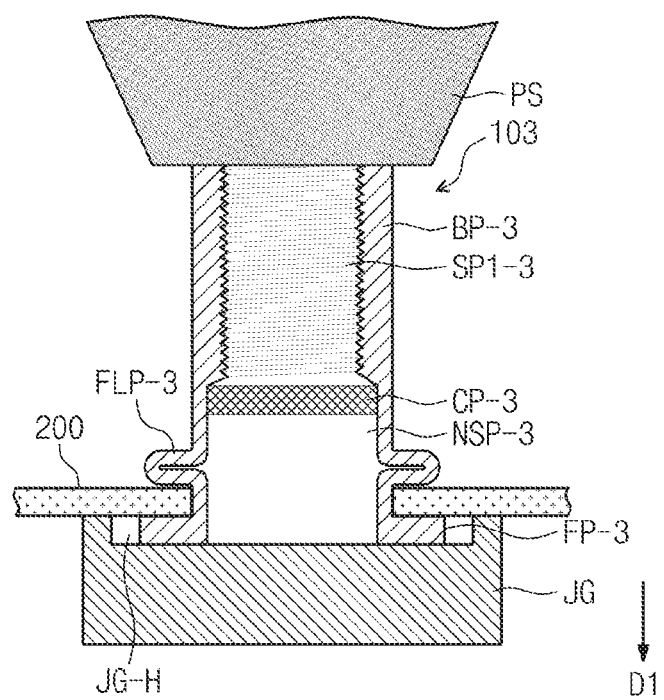

According to the above-mentioned structure of the cover part CP-3, the cover part CP-3 prevents foreign substances from entering into the screw part SP1-3 from the non-screw part NSP-3. In addition, an inner side surface of the body BP-3 is connected to the cover part CP-3 between the first and second sections S1 and S2, and thus, rigidity of the body BP-3 may be maintained. Thus, although the pressing process to be described later with reference to FIGS. 12B and 12C is performed on the coupling member 103, the screw part SP1-3 of the coupling member 103 may be prevented from being deformed by the cover part CP-3.

Figure 11:
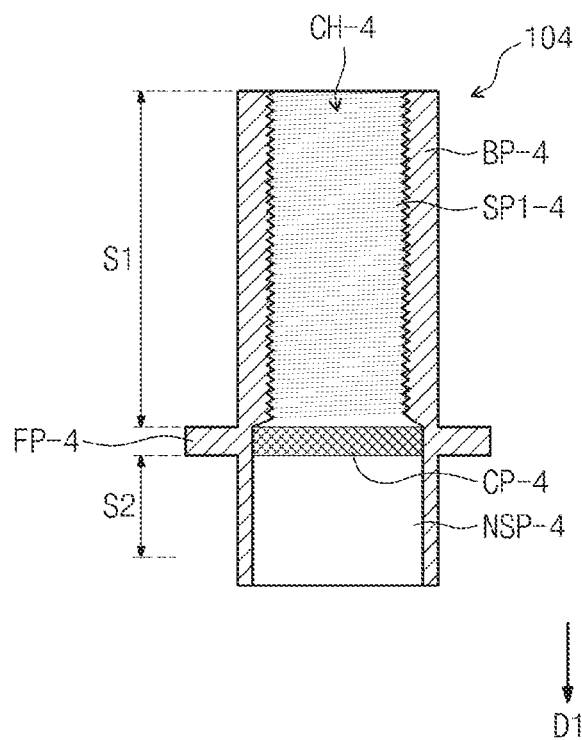
FIG. 11 is a cross-sectional view showing a coupling member according to an exemplary embodiment of the present inventive concept.

FIG. 11 is a cross-sectional view showing a coupling member 104 according to an exemplary embodiment of the present inventive concept.

Referring to FIG. 11, the coupling member 104 provides a coupling hole CH-4 to be coupled to an external bolt. The coupling member 104 includes a body BP-4, a screw part SP1-4, a non-screw part NSP-4, a flange part FP-4, and a cover part CP-4. The body BP-4 includes a first section S1 and a second section S2 sequentially arranged in a first direction D1.

In the present exemplary embodiment, the flange part FP-4 is disposed between the screw part SP1-4 and the non-screw part NSP-4. As shown in FIG. 12A, when the coupling member 104 is inserted into a hole 205 (refer to FIG. 12A) of the object 200 (refer to FIG. 12A), the flange part FP-4 makes contact with the object 200. In addition, in the case where the pressing process is performed on the coupling member 104, the non-screw part NSP-4 is folded and the coupling member 104 is fixed to the object 200 by the folded non-screw part NSP-4 and the flange part FP-4.

FIGS. 12A to 12E are views showing a method of fixing the coupling member 103 shown in FIG. 10 to the object 200, according to an exemplary embodiment of the present inventive concept.

Referring to FIGS. 12A and 12B, the coupling member 103 is inserted into the hole 205 of the object 200. As a result, a portion of a first surface 201 of the object 200 makes contact with the flange part FP-3 of the coupling member 103 inserted into the hole 205. A second surface 202 of the object 200 is opposite the first surface 201 of the object 200.

Then, as shown in FIG. 12B, the coupling member 103 inserted into the hole 205 is supported using a jig JG in which a fixing recess JG-H is defined. In more detail, the jig JG supports the object 200 such that the flange part FP-3 is accommodated in the fixing recess JG-H. Accordingly, another portion of the first surface 201 of the object 200 makes contact with the jig JG.

Figure 12D:
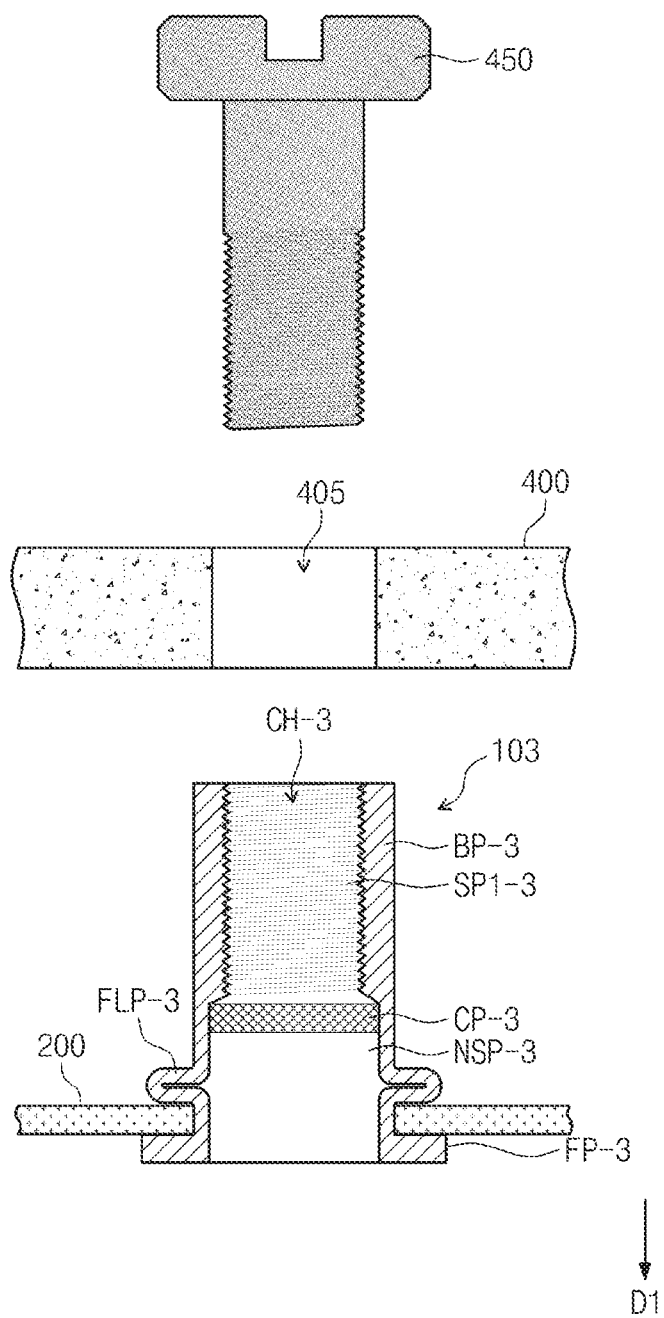

Referring to FIGS. 12C and 12D, the pressing process is performed on the coupling member 103 while the jig JG supports the object 200 and the coupling member 103. In the present exemplary embodiment, a pressing member PS is disposed to face the jig JG such that the coupling member 103 is disposed between the jig JG and the pressing member PS, and then, the pressing member PS pressurizes the edge of the coupling member 103 toward the first direction D1, thereby performing the pressing process.

When the pressing member PS pressurizes the edge of the coupling member 103 toward the first direction D1, pressure is applied to the non-screw part NSP-3. As a result, the non-screw part NSP-3 is folded and the folding part FLP-3 is formed at the coupling member 103. In the present exemplary embodiment, since the thickness T1 (refer to FIG. 10) of the body BP-3 corresponding to the non-screw part NSP-3 is smaller than the thickness T2 (refer to FIG. 10) of the body BP-3 corresponding to the screw part SP1-3 as described with reference to FIG. 10, the non-screw part NSP-3 is folded by the applied pressure rather than the screw part SP1-3.

When the non-screw part NSP-3 is folded to form the folding part FLP-3, the folding part FLP-3 makes contact with the second surface 202 of the object 200. In addition, the object 200 is interposed between the flange part FP-3 and the folding part FLP-3 and the flange part FP-3 and the folding part FLP-3 grip the object 200 like a clamp when viewed in a cross section. Accordingly, the coupling member 103 may be fixed to the object 200 by the flange part FP-3 and the folding part FLP-3.

In the present exemplary embodiment, the coupling member 103 includes the cover part CP-3. Therefore, a foreign substance may be prevented from entering into the screw part SP1-3 from the non-screw part NSP-3 during the pressing process. In addition, the rigidity of the screw part SP1-3 may be maintained by the cover part CP-3 during the pressing process. Thus, the screw part SP1-3 may be prevented from being deformed by the cover part CP-3 after the pressing process is completed, and thus, the bolt 450 (refer to FIG. 12D) may be easily engaged with the screw part SP1-3.

Figure 12E:
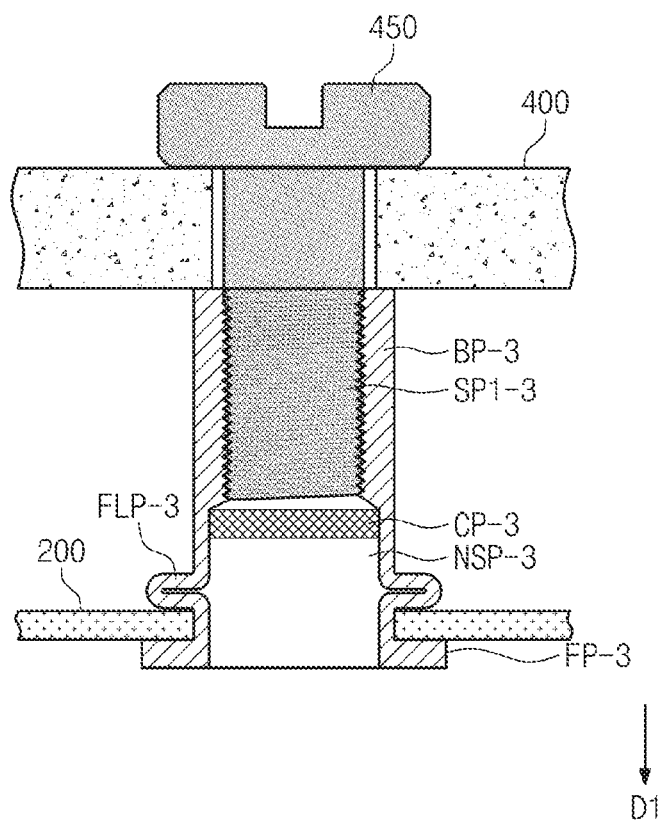

Referring to FIGS. 12D and 12E, after the folding part FLP-3 is formed at the coupling member 103, a member 400 is placed on the coupling member 103 and the bolt 450 is provided to the coupling member 103 after passing through a thru-hole 405 formed through the member 400.

Then, the bolt 450 is rotated and coupled to the coupling member 103. Therefore, the object 200 is fixed to the member 400 by the coupling force between the bolt 450 and the coupling member 103.

When a lower side of the object 200 is referred to as an inside of the object 200 and an upper side of the object 200 is referred to as an outside of the object 200, the flange part FP-3 is disposed inside of the object 200, and other parts of the coupling member 103 except for the flange part FP-3 are disposed outside of the object 200. Thus, since a space, in which the screw part SP1-3 is accommodated, does not have to be defined inside of the object 200, a volume of a protruding portion of the coupling member 103, which is protruded to the inside of the object 200, may be reduced.

Although the present inventive concept has been shown and described with reference to exemplary embodiments thereof, it is understood by those of ordinary skill in the art that various changes in form and detail can be made thereto without departing from the spirit and scope of the present inventive concept as hereinafter claimed.

What is claimed is:

1. A coupling member, comprising:
 a body comprising a first section, a second section, and a third section;
 a first screw part disposed along a first inner portion of the body corresponding to the first section;
 a second screw part disposed along a second inner portion of the body corresponding to the second section;
 a non-screw part disposed in a third inner portion of the body corresponding to the third section, wherein the non-screw part is connected to at least one of the first screw part and the second screw part;
 a cover part disposed in the body to block between at least one of the first, second, and third sections and the other; and
 a flange disposed adjacent to the non-screw part and coupled to an outer circumference of the body,
 wherein a first inner diameter of the non-screw part is greater than a second inner diameter of the first screw part and a third inner diameter of the second screw part.

2. The coupling member of claim 1, wherein the first screw part is hollow and includes first screw threads and the second crew part is hollow and includes second screw threads,
 wherein the cover part is disposed between the first screw part and the second screw part in the body to block between the first screw part and the second screw part, and
 wherein a first side of the cover part is exposed within the first screw part and a second side of the cover part is exposed within the second screw part.

3. The coupling member of claim 2, wherein the first screw part, the second screw part, and the non-screw part are sequentially arranged in a longitudinal direction of the body.

4. The coupling member of claim 2, wherein the first screw part and the non-screw part are sequentially arranged in a longitudinal direction of the body and at least a portion of the second screw part is surrounded by the non-screw part.

5. The coupling member of claim 4, further comprising a sub-body disposed inside of the body to correspond to the second section, wherein the second screw part is disposed inside of the sub-body.

6. The coupling member of claim 4, wherein the second inner diameter of the first screw part is greater than the third inner diameter of the second screw part.

7. The coupling member of claim 1, wherein the cover part is disposed between the second screw part and the non-screw part in the body to block between the second screw part and the non-screw part.

8. The coupling member of claim 7, wherein the first screw part, the second screw part, and the non-screw part are sequentially arranged in a longitudinal direction of the body.

9. The coupling member of claim 7, wherein the flange part is disposed adjacent to the cover part disposed between the second screw part and the non-screw part.

10. A coupling member, comprising:
- a body comprising a first section, a second section, and a third section;
- a first screw part disposed along a first inner portion of the body corresponding to the first section;
- a second screw part disposed along a second inner portion of the body corresponding to the second section;
- a non-screw part disposed in a third inner portion of the body corresponding to the third section, wherein the non-screw part is connected to at least one of the first screw part and the second screw part;
- a cover part disposed between the first screw part and the second screw part in the body to block between the first screw part and the second screw part; and
- a flange part disposed adjacent to the non-screw part and coupled to an outer circumference of the body.

* * * * *